(12) United States Patent
Yang et al.

(10) Patent No.: US 11,558,887 B2
(45) Date of Patent: Jan. 17, 2023

(54) UPLINK CONTROL INFORMATION PIGGYBACK RESTRICTIONS FOR ULTRA-RELIABLE/LOW-LATENCY COMMUNICATIONS

(71) Applicant: QUALCOMM incorporated, San Diego, CA (US)

(72) Inventors: Wei Yang, San Diego, CA (US); Seyedkianoush Hosseini, San Diego, CA (US); Yi Huang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 192 days.

(21) Appl. No.: 17/155,693

(22) Filed: Jan. 22, 2021

(65) Prior Publication Data

US 2021/0243786 A1      Aug. 5, 2021

Related U.S. Application Data

(60) Provisional application No. 62/968,886, filed on Jan. 31, 2020.

(51) Int. Cl.
*H04W 4/00* (2018.01)
*H04W 72/12* (2009.01)
*H04L 5/00* (2006.01)
*H04W 72/04* (2009.01)

(52) U.S. Cl.
CPC ....... *H04W 72/1284* (2013.01); *H04L 5/0055* (2013.01); *H04W 72/0446* (2013.01); *H04W 72/1257* (2013.01); *H04W 72/1268* (2013.01)

(58) Field of Classification Search
CPC ......... H04W 72/1284; H04W 72/0446; H04W 72/1257; H04W 72/1268; H04L 5/0055; H04L 5/0053; H04L 5/0042; H04L 5/0044
USPC ....................................................... 370/329
See application file for complete search history.

(56) References Cited

U.S. PATENT DOCUMENTS

| | | | |
|---|---|---|---|
| 2019/0230683 A1 | 7/2019 | Akkarakaran et al. | |
| 2019/0246432 A1* | 8/2019 | Hosseini | H04W 72/1284 |
| 2019/0306922 A1* | 10/2019 | Xiong | H04L 1/1664 |
| 2020/0008158 A1* | 1/2020 | Yamamoto | H04W 52/241 |

(Continued)

OTHER PUBLICATIONS

International Search Report and Written Opinion—PCT/US2021/014864—ISA/EPO—dated May 14, 2021.

*Primary Examiner* — Mang Hang Yeung
(74) *Attorney, Agent, or Firm* — Holland & Hart LLP

(57) ABSTRACT

Methods, systems, and devices for wireless communications are described. A user equipment (UE) may identify that an uplink data transmission scheduled for transmission by the UE in a first transmission time interval overlaps with multiple uplink control transmissions also scheduled for transmission by the UE during corresponding second transmission time intervals that are shorter in duration than the first transmission time interval. The UE may determine that the multiple uplink control transmissions satisfy a scheduling constraint that is based at least in part on an uplink control transmission type of the multiple uplink control transmissions that overlap with the uplink data transmission. The UE may transmit the uplink data transmission and the multiple uplink control transmissions based at least in part on the scheduling constraint being satisfied.

56 Claims, 16 Drawing Sheets

(56) References Cited

U.S. PATENT DOCUMENTS

| | | | |
|---|---|---|---|
| 2020/0145167 A1* | 5/2020 | Jung | H04W 72/042 |
| 2020/0228248 A1* | 7/2020 | Islam | H04L 1/1812 |
| 2021/0105766 A1* | 4/2021 | Wang | H04L 5/0055 |
| 2022/0095335 A1* | 3/2022 | Gao | H04L 1/1887 |
| 2022/0150918 A1* | 5/2022 | Xu | H04W 72/14 |

* cited by examiner

UPLINK CONTROL INFORMATION PIGGYBACK RESTRICTIONS FOR ULTRA-RELIABLE/LOW-LATENCY COMMUNICATIONS

CROSS REFERENCE

The present application for patent claims the benefit of U.S. Provisional patent Application No. 62/968,886 by YANG et al., entitled "UPLINK CONTROL INFORMATION PIGGYBACK RESTRICTIONS FOR ULTRARELIABLE/LOW-LATENCY COMMUNICATIONS," filed Jan. 31, 2020, assigned to the assignee hereof, and expressly incorporated by reference herein.

FIELD OF TECHNOLOGY

The following relates generally to wireless communications and more specifically to uplink control information piggyback restrictions for ultra-reliable/low-latency communications.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

SUMMARY

The described techniques relate to improved methods, systems, devices, and apparatuses that support uplink control information (UCI) piggyback restrictions for ultra-reliable/low-latency communications (URLLC). Generally, the described techniques provide for a scheduling constraint to be defined regarding overlapping physical uplink shared channel (PUSCH) and physical uplink control channel (PUCCH) transmissions. In some aspects, the scheduling constraint may be triggered when the user equipment (UE) is configured with a subslotLength-ForPUCCH (e.g., sub-slots configured for PUCCH transmissions). In this situation, the UE may have multiple sub-slot PUCCH transmissions that overlap with a slot PUSCH transmission. The UCI piggyback restrictions in this situation may include that the UE is not expected to multiplex a PUSCH transmission in one slot (e.g., a first transmission time interval (TTI)) with multiple UCIs (e.g., multiple uplink control transmissions) having the same type, when the UCIs would otherwise be transmitted by the UE in PUCCH transmissions in different sub-slots (e.g., corresponding second TTIs). That is, the UE is not expected to multiplex a PUSCH transmission having a slot duration of X in one slot with UCI of the same type that the UE would transmit in PUCCHs with slot duration Y if Y is less than X, where X and Y are positive numbers. Accordingly, in some aspects the base station would not schedule (e.g., may avoid scheduling) overlapping PUSCH and UCI PUCCH transmissions that violate, or otherwise do not satisfy, the scheduling constraint.

Accordingly, the base station may schedule the UE for an uplink data transmission (e.g., a PUSCH transmission) for transmission by the UE in a first TTI (e.g., in a slot) that overlaps with multiple uplink control transmissions (e.g., UCI PUCCH transmissions) that are also scheduled for transmission by the UE during corresponding second TTIs (e.g., during sub-slots within the slot) that are shorter in duration than the first TTI. The base station may schedule the UE in accordance with the scheduling constraint that is based, at least in some aspects, on the uplink control transmission type of the multiple uplink control transmissions. The UE may determine or otherwise identify that the uplink data transmission scheduled for transmission by the UE in the first TTI overlaps with the multiple uplink control transmissions also scheduled for transmission by the UE during their corresponding second TTIs that are shorter in duration than the first TTI. The UE may determine that the multiple uplink control transmission satisfy the scheduling constraint (e.g., based on the transmission type for each of the multiple uplink control transmissions) and, if so, transmit the uplink data transmission and the multiple uplink control transmissions.

A method of wireless communications at a UE is described. The method may include identifying that an uplink data transmission scheduled for transmission by the UE in a first transmission time interval overlaps with multiple uplink control transmissions also scheduled for transmission by the UE during corresponding second transmission time intervals that are shorter in duration than the first transmission time interval, determining that the multiple uplink control transmissions satisfy a scheduling constraint that is based at least in part on an uplink control transmission type of the multiple uplink control transmissions that overlap with the uplink data transmission, and transmitting the uplink data transmission and the multiple uplink control transmissions based at least in part on the scheduling constraint being satisfied.

An apparatus for wireless communications at a UE is described. The apparatus may include a processor, memory coupled with the processor, and instructions stored in the memory. The instructions may be executable by the processor to cause the apparatus to identify that an uplink data transmission scheduled for transmission by the UE in a first transmission time interval overlaps with multiple uplink control transmissions also scheduled for transmission by the UE during corresponding second transmission time intervals that are shorter in duration than the first transmission time interval, determine that the multiple uplink control transmissions satisfy a scheduling constraint that is based at least in part on an uplink control transmission type of the multiple uplink control transmissions that overlap with the uplink data transmission, and transmit the uplink data transmission and the multiple uplink control transmissions based at least in part on the scheduling constraint being satisfied.

Another apparatus for wireless communications at a UE is described. The apparatus may include means for identifying that an uplink data transmission scheduled for transmission by the UE in a first transmission time interval overlaps with multiple uplink control transmissions also scheduled for transmission by the UE during corresponding second transmission time intervals that are shorter in duration than the first transmission time interval, means for determining that the multiple uplink control transmissions satisfy a scheduling constraint that is based at least in part on an uplink control transmission type of the multiple uplink control transmissions that overlap with the uplink data transmission, and means for transmitting the uplink data transmission and the multiple uplink control transmissions based at least in part on the scheduling constraint being satisfied.

A non-transitory computer-readable medium storing code for wireless communications at a UE is described. The code may include instructions executable by a processor to identify that an uplink data transmission scheduled for transmission by the UE in a first transmission time interval overlaps with multiple uplink control transmissions also scheduled for transmission by the UE during corresponding second transmission time intervals that are shorter in duration than the first transmission time interval, determine that the multiple uplink control transmissions satisfy a scheduling constraint that is based at least in part on an uplink control transmission type of the multiple uplink control transmissions that overlap with the uplink data transmission, and transmit the uplink data transmission and the multiple uplink control transmissions based at least in part on the scheduling constraint being satisfied.

Some examples of the method, apparatuses, and non-transitory computer-readable medium described herein may further include operations, features, means, or instructions for identifying an uplink control transmission type for each of the multiple uplink control transmissions, determining that the uplink control transmission types are different for the multiple uplink control transmissions, and determining that the multiple uplink control transmissions satisfy the scheduling constraint based at least in part on the different uplink control transmission type.

In some examples of the method, apparatuses, and non-transitory computer-readable medium described herein, the different uplink control transmission type includes an acknowledgement/negative-acknowledgement (ACK/NACK) transmission type and a non-ACK/NACK transmission type. In some examples of the method, apparatuses, and non-transitory computer-readable medium described herein, the different uplink control transmission type includes a channel performance feedback transmission type and a non-channel performance feedback transmission type.

Some examples of the method, apparatuses, and non-transitory computer-readable medium described herein may further include operations, features, means, or instructions for identifying an uplink control transmission type for each of the multiple uplink control transmissions, determining that the uplink control transmission types are the same for the multiple uplink control transmissions, and determining that the multiple uplink control transmissions satisfy the scheduling constraint based at least in part on the same uplink control transmission type.

In some examples of the method, apparatuses, and non-transitory computer-readable medium described herein, the same uplink control transmission type includes a scheduling request transmission type.

In some examples of the method, apparatuses, and non-transitory computer-readable medium described herein, the scheduling constraint is satisfied when the uplink control transmission type associated with each of the multiple uplink control transmissions of the corresponding second transmission time intervals are different. In some examples of the method, apparatuses, and non-transitory computer-readable medium described herein, the scheduling constraint is not satisfied when at least two of the uplink control transmission type associated with each of the multiple uplink control transmissions of the corresponding second transmission time intervals are the same. In some examples of the method, apparatuses, and non-transitory computer-readable medium described herein, the scheduling constraint is not satisfied when at least two of the multiple uplink control transmissions are of an ACK/NACK transmission type. In some examples of the method, apparatuses, and non-transitory computer-readable medium described herein, the scheduling constraint is not satisfied when at least two of the multiple uplink control transmissions are of a channel performance feedback transmission type. In some examples of the method, apparatuses, and non-transitory computer-readable medium described herein, the first transmission time interval includes a slot and the corresponding second transmission time intervals include sub-slots.

A method of wireless communications at a base station is described. The method may include scheduling an uplink data transmission for transmission by a UE in a first transmission time interval that overlaps with multiple uplink control transmissions also scheduled for transmission by the UE during corresponding second transmission time intervals that are shorter in duration than the first transmission time interval, the multiple uplink control transmissions satisfying a scheduling constraint that is based at least in part on an uplink control transmission type of the multiple uplink control transmissions that overlap with the uplink data transmission, and receiving the uplink data transmission and the multiple uplink control transmissions based at least in part on the scheduling constraint being satisfied.

An apparatus for wireless communications at a base station is described. The apparatus may include a processor, memory coupled with the processor, and instructions stored in the memory. The instructions may be executable by the processor to cause the apparatus to schedule an uplink data transmission for transmission by a UE in a first transmission time interval that overlaps with multiple uplink control transmissions also scheduled for transmission by the UE during corresponding second transmission time intervals that are shorter in duration than the first transmission time interval, the multiple uplink control transmissions satisfying a scheduling constraint that is based at least in part on an uplink control transmission type of the multiple uplink control transmissions that overlap with the uplink data transmission, and receive the uplink data transmission and the multiple uplink control transmissions based at least in part on the scheduling constraint being satisfied.

Another apparatus for wireless communications at a base station is described. The apparatus may include means for scheduling an uplink data transmission for transmission by a UE in a first transmission time interval that overlaps with multiple uplink control transmissions also scheduled for transmission by the UE during corresponding second transmission time intervals that are shorter in duration than the first transmission time interval, the multiple uplink control transmissions satisfying a scheduling constraint that is based at least in part on an uplink control transmission type of the multiple uplink control transmissions that overlap with the uplink data transmission, and means for receiving the uplink data transmission and the multiple uplink control transmissions based at least in part on the scheduling constraint being satisfied.

A non-transitory computer-readable medium storing code for wireless communications at a base station is described. The code may include instructions executable by a processor to schedule an uplink data transmission for transmission by a UE in a first transmission time interval that overlaps with multiple uplink control transmissions also scheduled for transmission by the UE during corresponding second transmission time intervals that are shorter in duration than the first transmission time interval, the multiple uplink control transmissions satisfying a scheduling constraint that is based at least in part on an uplink control transmission type of the multiple uplink control transmissions that overlap with the uplink data transmission, and receive the uplink data transmission and the multiple uplink control transmissions based at least in part on the scheduling constraint being satisfied.

Some examples of the method, apparatuses, and non-transitory computer-readable medium described herein may further include operations, features, means, or instructions for identifying an uplink control transmission type for each of the multiple uplink control transmissions, determining that the uplink control transmission types are different for the multiple uplink control transmissions, and determining that the multiple uplink control transmissions satisfy the scheduling constraint based at least in part on the different uplink control transmission type.

In some examples of the method, apparatuses, and non-transitory computer-readable medium described herein, the different uplink control transmission type includes an ACK/NACK transmission type and a non-ACK/NACK transmission type. In some examples of the method, apparatuses, and non-transitory computer-readable medium described herein, the different uplink control transmission type includes a channel performance feedback transmission type and a non-channel performance feedback transmission type.

Some examples of the method, apparatuses, and non-transitory computer-readable medium described herein may further include operations, features, means, or instructions for identifying an uplink control transmission type for each of the multiple uplink control transmissions, determining that the uplink control transmission types are the same for the multiple uplink control transmissions, and determining that the multiple uplink control transmissions satisfy the scheduling constraint based at least in part on the same uplink control transmission type.

In some examples of the method, apparatuses, and non-transitory computer-readable medium described herein, the same uplink control transmission type includesz a scheduling request transmission type.

In some examples of the method, apparatuses, and non-transitory computer-readable medium described herein, the scheduling constraint is satisfied when the uplink control transmission type associated with each of the multiple uplink control transmissions of the corresponding second transmission time intervals are different. In some examples of the method, apparatuses, and non-transitory computer-readable medium described herein, the scheduling constraint is not satisfied when at least two of the uplink control transmission type associated with each of the multiple uplink control transmissions of the corresponding second transmission time intervals are the same. In some examples of the method, apparatuses, and non-transitory computer-readable medium described herein, the scheduling constraint is not satisfied when at least two of the multiple uplink control transmissions are of an ACK/NACK transmission type. In some examples of the method, apparatuses, and non-transitory computer-readable medium described herein, the scheduling constraint is not satisfied when at least two of the multiple uplink control transmissions are of a channel performance feedback transmission type. In some examples of the method, apparatuses, and non-transitory computer-readable medium described herein, the first transmission time interval includes a slot and the corresponding second transmission time intervals include sub-slots.

DETAILED DESCRIPTION

Figure 1:
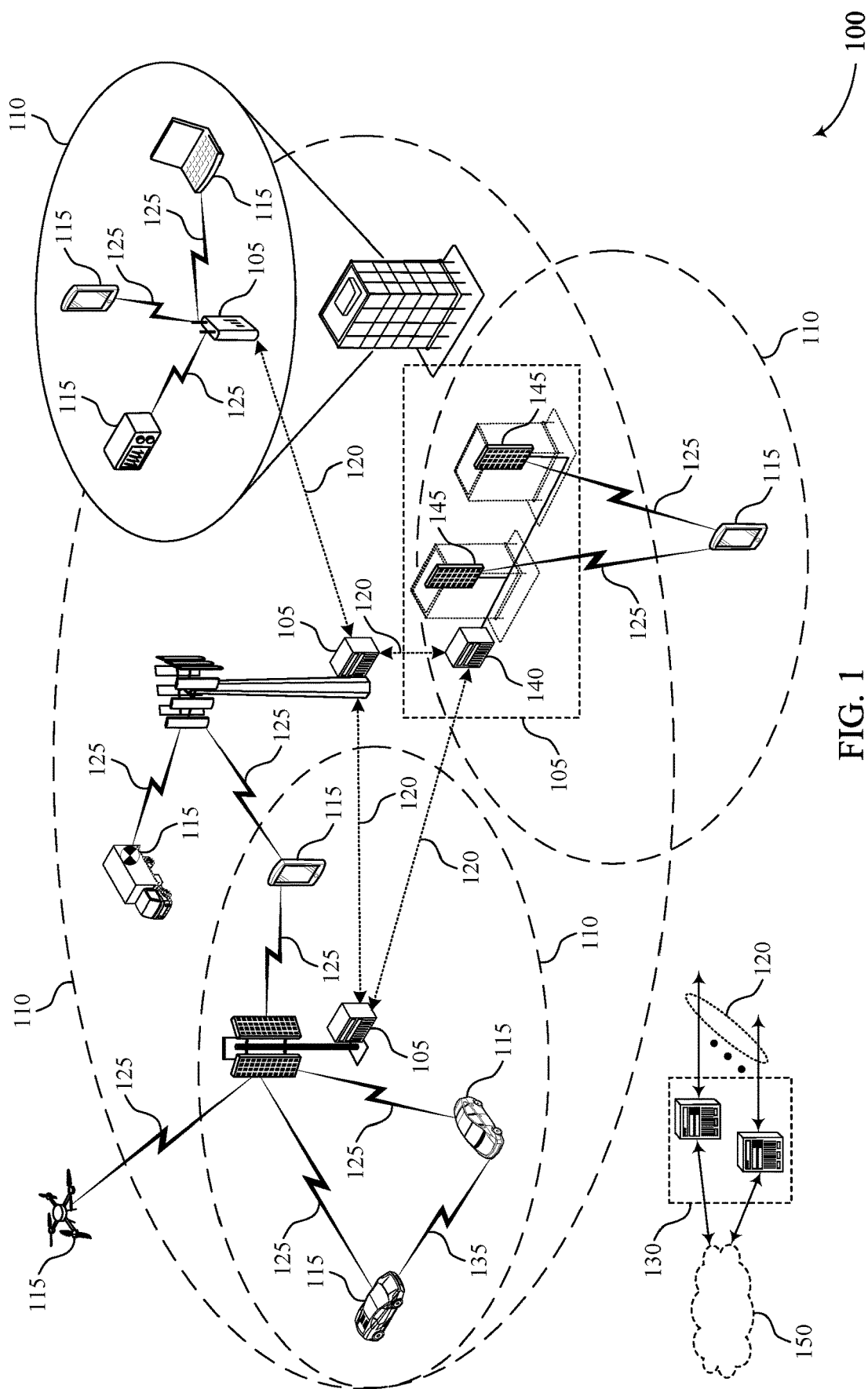
FIG. 1 illustrates an example of a system for wireless communications that supports uplink control information (UCI) piggyback restrictions for ultra-reliable/low-latency communications (URLLC) in accordance with aspects of the present disclosure.

In some wireless communication systems, a user equipment (UE) may multiplex an uplink control transmission with an uplink data transmission when the uplink control transmission overlaps (e.g., in the time domain) with the uplink data transmission. However, some wireless communication systems may support the UE being configured with sub-slots for uplink control transmissions such that multiple sub-slots may occur within the slot configured for the uplink data transmission. That is, the UE may be configured to support multiple uplink control transmissions within respective sub-slots (or physical uplink control channel (PUCCH) slots) that have shorter durations than an overlapping slot in which a physical uplink shared channel (PUSCH) transmission is scheduled. In some situations, this may be acceptable as the control information being conveyed in the uplink control transmissions can be easily and quickly identified and then multiplexed with the uplink data transmission. That is, the UE can, for some uplink control transmission types, quickly determine the control information to be conveyed and then multiplex that control information with the data information for transmission in the uplink data transmission in the slot. However, some uplink control transmission types are more complicated, where the content of the uplink control transmission may take longer or otherwise be more complicated for the UE to identify, process, etc. This may create the situation where the UE may struggle with preparing and multiplexing the uplink control transmission with the uplink data transmission, which may result in a delay or loss of the uplink data transmission, the uplink control transmission, or both. This may be even more problematic for high priority/low latency communications, such as ultra-reliable/low-latency communications (URLLC).

Aspects of the disclosure are initially described in the context of wireless communications systems. Generally, the described techniques provide for a scheduling constraint to be defined regarding overlapping PUSCH and PUCCH transmissions. In some aspects, the scheduling constraint may be triggered when the UE is configured with a subslot-Length-ForPUCCH (e.g., sub-slots configured for PUCCH transmissions). In this situation, the UE may have multiple sub-slot PUCCH transmissions that overlap with a slot PUSCH transmission. The UCI piggyback restrictions in this situation may include that the UE is not expected to multiplex a PUSCH transmission in one slot (e.g., a first transmission time interval (TTI)) with multiple UCIs (e.g., multiple uplink control transmissions) having the same type, when the UCIs would otherwise be transmitted by the UE in PUCCH transmissions in different sub-slots (e.g., corresponding second TTIs). That is, the UE is not expected to multiplex a PUSCH transmission having a slot duration of X in one slot with UCI of the same type that the UE would transmit in PUCCHs with slot duration Y if Y is less than X, where X and Y are positive numbers. Accordingly, in some aspects the base station would not schedule (e.g., may avoid scheduling) overlapping PUSCH and UCI PUCCH transmissions that violate, or otherwise do not satisfy, the scheduling constraint.

Accordingly, the base station may schedule the UE for an uplink data transmission (e.g., a PUSCH transmission) for transmission by the UE in a first TTI (e.g., in a slot) that overlaps with multiple uplink control transmissions (e.g., UCI PUCCH transmissions) that are also scheduled for transmission by the UE during corresponding second TTIs (e.g., during sub-slots within the slot) that are shorter in duration than the first TTI. The base station may schedule the UE in accordance with the scheduling constraint that is based, at least in some aspects, on the uplink control transmission type of the multiple uplink control transmissions. The UE may determine or otherwise identify that the uplink data transmission scheduled for transmission by the UE in the first TTI overlaps with the multiple uplink control transmissions also scheduled for transmission by the UE during their corresponding second TTIs that are shorter in duration than the first TTI. The UE may determine that the multiple uplink control transmission satisfy the scheduling constraint (e.g., based on the transmission type for each of the multiple uplink control transmissions) and, if so, transmit the uplink data transmission and the multiple uplink control transmissions.

Aspects of the disclosure are further illustrated by and described with reference to apparatus diagrams, system diagrams, and flowcharts that relate to UCI piggyback restrictions for URLLC.

FIG. 1 illustrates an example of a wireless communications system 100 that supports UCI piggyback restrictions for URLLC in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology).

The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

One or more numerologies for a carrier may be supported, where a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

Each base station 105 may provide communication coverage via one or more cells, for example a macro cell, a small cell, a hot spot, or other types of cells, or any combination thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of the base station 105. For example, a cell may be or include a building, a subset of a building, or exterior spaces between or overlapping with geographic coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered base station 105, as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A base station 105 may support one or multiple cells and may also support communications over the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may support synchronous or asynchronous operation. For synchronous operation, the base stations 105 may have similar frame timings, and transmissions from different base stations 105 may be approximately aligned in time. For asynchronous operation, the base stations 105 may have different frame timings, and transmissions from different base stations 105 may, in some examples, not be aligned in time. The techniques described herein may be used for either synchronous or asynchronous operations.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for the UEs 115 include entering a power saving deep sleep mode when not engaging in active communications, operating over a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

In some systems, the D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., base stations 105) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to the network operators IP services 150. The operators IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

A UE 115 may identify that an uplink data transmission scheduled for transmission by the UE 115 in a first transmission time interval overlaps with multiple uplink control transmissions also scheduled for transmission by the UE 115 during corresponding second transmission time intervals that are shorter in duration than the first transmission time interval. The UE 115 may determine that the multiple uplink control transmissions satisfy a scheduling constraint that is based at least in part on an uplink control transmission type of the multiple uplink control transmissions that overlap with the uplink data transmission. The UE 115 may transmit the uplink data transmission and the multiple uplink control transmissions based at least in part on the scheduling constraint being satisfied.

A base station 105 may schedule an uplink data transmission for transmission by a UE 115 in a first transmission time interval that overlaps with multiple uplink control transmissions also scheduled for transmission by the UE 115 during corresponding second transmission time intervals that are shorter in duration than the first transmission time interval, the multiple uplink control transmissions satisfying a scheduling constraint that is based at least in part on an uplink control transmission type of the multiple uplink control transmissions that overlap with the uplink data transmission. The base station 105 may receive the uplink data transmission and the multiple uplink control transmissions based at least in part on the scheduling constraint being satisfied.

Figure 2:
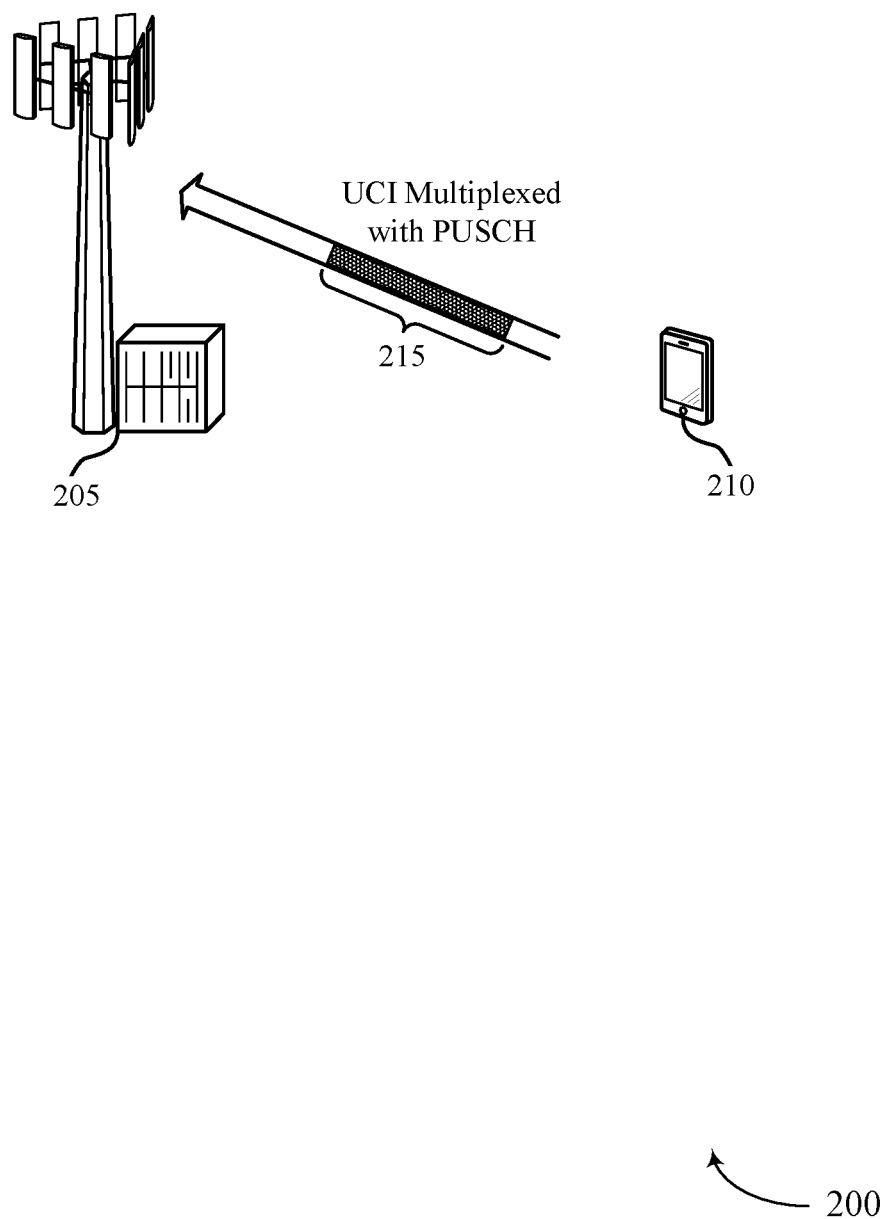
FIG. 2 illustrates an example of a wireless communication system that supports UCI piggyback restrictions for URLLC in accordance with aspects of the present disclosure.

FIG. 2 illustrates an example of a wireless communication system 200 that supports UCI piggyback restrictions for URLLC in accordance with aspects of the present disclosure. In some examples, wireless communication system 200 may implement aspects of wireless communication system 100. Wireless communication system 200 may include base station 205 and UE 210, which may be examples of the corresponding devices described herein.

Generally, wireless communication system 200 illustrates an example where base station 205 may act as a serving or source base station for UE 210. For example, base station 205 may schedule uplink and/or downlink communications between base station 205 and UE 210. The scheduled communications may utilize dynamically and/or semi-statically configured resources, e.g., such as time, frequency, spatial, and/or code resources. In some aspects, base station 205 may autonomously schedule such communications and/or allocate appropriate resources, or may do so in conjunction with one or more network entities, such as a core network. The downlink communications may include transmissions from base station 205 to UE 210 and the uplink communications may include transmissions from UE 210 to base station 205.

Communications between base station 205 and UE 210 may include data and/or control information being communicated. For example, a data transmission may be communicated over a corresponding data channel, such as a PDSCH and/or PUSCH. A control transmission may be communicated over a corresponding control channel, such as a PDCCH and/or PUCCH. Examples of control information being communicated may include, but are not limited to, acknowledgment/negative-acknowledgment (ACK/NACK, or more simply A/N), channel state information (CSI), scheduling request (SR), and the like. In the downlink, such control information may be referred to as downlink control information (DCI). In the uplink, such control information may be referred to more generally as uplink control information (UCI).

In some wireless communication systems, UE 210 may be configured or otherwise scheduled to transmit uplink control information (e.g., ACK/NACK, CSI, SR, etc., communicated in an uplink control transmission) that collides (e.g., overlaps) in the time domain with an uplink data transmission (e.g., a PUSCH transmission). In this situation, UE 210 may be allowed to piggyback (e.g., multiplex) the uplink control information (e.g., ACK/NACK) into the uplink data transmission (e.g., PUSCH). However, typically such wireless communication systems are configured such that one uplink control transmission (e.g., PUCCH) is allowed in the slot (e.g., a TTI) in which the uplink data transmission is scheduled.

In other wireless communication systems, UE 210 may be configured for sub-slot based PUCCH transmissions. That is, the duration of the sub-slots used for uplink control transmissions may be shorter than the duration of the slot in which the uplink data transmission is scheduled. For example, two, three, four, etc., PUCCH sub-slots may be configured within a PUSCH slot. Accordingly, UE 210 may be configured with a bit, a field, or other indication (e.g., such as a subslotLength-ForPUCCH field) indicating that UE 210 may support transmitting multiple uplink control transmissions (e.g., ACK/NACK, CSI, SR, etc.) in the corresponding PUCCH sub-slots that overlap with the slot in which the uplink data transmission is scheduled. Since the PUCCH sub-slot is shorter in duration than the PUSCH slot, one PUSCH transmission in the slot may collide with multiple PUCCH transmissions in the corresponding PUCCH sub-slots. Broadly, if UE 210 is configured with a subslotLength-ForPUCCH, the term "slot" or "sub-slot" for an associated PUCCH transmission may include a number of symbols indicated in the subslotLength-ForPUCCH indication.

More particularly with respect to terminology, the slot in which the uplink data transmission (e.g., PUSCH slot) is scheduled may correspond to a first TTI and the sub-slots in which the multiple uplink control transmissions (e.g., PUCCH transmissions) are scheduled may correspond to a respective second TTIs. Generally, the duration for the second TTIs (e.g., the PUCCH sub-slots) may be shorter than the duration of the first TTI (e.g., the PUSCH slot). However, it is to be understood that the described techniques are not limited to any particular frame, subframe, slot, and the like. Instead, the first TTI in which the uplink data transmission (PUSCH) is scheduled may refer to any time duration allocated for the uplink data transmission and the second TTIs in which the uplink control transmissions are scheduled may refer to any time duration allocated for the uplink control transmission that are shorter in duration than the first TTI. For example, the first TTI may refer to a subframe, with the second TTIs referring to slot(s). In another example, the first TTI may refer to a slot, with the second TTIs referring to sub-slots or mini-slots that at least partially overlap in the time domain with the slot. In yet another example, the first TTI may refer to a sub-slot or mini slot, with the second TTIs referring to one or more symbols within the sub-slots or mini slot. As indicated above, the field subslotLength-ForPUCCH configured for UE 210 may identify the duration (e.g., symbols) of the second TTIs.

In some situations, the techniques discussed above may be acceptable as the control information being conveyed in the uplink control transmissions can be easily and quickly identified and then multiplexed into the uplink data transmission. That is, UE 210 can, for some uplink control transmission types, quickly determine the control information to be conveyed and then multiplex that control information with the data for transmission in the uplink data transmission in the first TTI. However, some uplink control transmission types are more complicated in nature, which takes longer and/or is more difficult for UE 210 to identify, process, etc. (e.g., due to the nature of the control information and/or the UE capability). This may create the situation where UE 210 may struggle with preparing and multiplexing the uplink control transmission with the uplink data transmission, which may result in a delay or loss of the uplink data transmission, the uplink control transmission, or both. This may be even more problematic for high priority/low latency communications, such as URLLC (although it is to be understood that the described techniques are not limited to URLLC).

Accordingly, the described techniques provide for a scheduling constraint to be defined regarding overlapping PUSCH and PUCCH transmissions. In some aspects, the scheduling constraint may be triggered when UE 210 is configured with a subslotLength-ForPUCCH (e.g., PUCCH sub-slots configured for multiple PUCCH transmissions). In this situation, UE 210 may not be expected to multiplex a PUSCH transmission in one slot (e.g., a first TTI) with multiple uplink control transmissions (e.g., UCIs) having the same transmission type that UE 210 would transmit in PUCCH transmissions in different sub-slots (e.g., the corresponding second TTIs) within the first TTI. That is, UE 210 is not expected to multiplex a PUSCH transmission having a slot duration of X in one slot with UCI of the same transmission type that UE 210 would transmit in PUCCHs with slot duration Y if Y<X, where X and Y are positive numbers. Accordingly, in some aspects base station 205 would not schedule (e.g., may avoid scheduling) overlapping PUSCH and UCI PUCCH transmissions that violate, or otherwise do not satisfy, the scheduling constraint.

That is, in a broad sense the scheduling constraint may avoid base station 205 scheduling UE 210 with an uplink data transmission (e.g., PUSCH transmission) with multiple uplink control transmissions (e.g., UCI) that overlap with the uplink data transmission. In some aspects, the scheduling constraint may be based on the transmission type for the multiple uplink control transmissions that overlap with the uplink data transmission. In one example of the scheduling constraint, when the transmission types for the multiple uplink control transmissions are the same, and the UE 210 would otherwise multiplex the UCI in the PUSCH if other UCIs do not exist, this may violate the scheduling constraint and, therefore, base station 205 may avoid this scheduling configuration. In the case where the UCI will not be multiplexed into the PUSCH (e.g., according to a rule) even when the other UCI does not exist (e.g., is not present), then the scheduling constraint may not apply. Examples of this include, but are not limited to, the transmission types for the multiple uplink control transmissions being two ACK/NACK uplink control transmissions, two CSI uplink control transmissions, and the like. However, in some examples the scheduling constraint may be satisfied (e.g., complied with) when the transmission types for the multiple uplink control transmissions are the same, e.g., the multiple uplink control transmissions are SR transmission types.

In another example of the scheduling constraint, when the transmission types for the multiple uplink control transmissions are different, this may satisfy (e.g., comply with) the scheduling constraint. Examples of this include, but are not limited to, the transmission type for one of the multiple uplink control transmissions being an ACK/NACK uplink control transmission, but the other transmission type(s) for the multiple uplink control transmissions being one or more CSI uplink control transmission(s), an SR uplink control transmission, and the like.

Accordingly, base station 205 may schedule UE 210 for an uplink data transmission 215 (e.g., a PUSCH transmission) for transmission by UE 215 in a first TTI (e.g., in a PUSCH slot) that overlaps with multiple uplink control transmissions (e.g., UCI PUCCH transmissions) that are also scheduled for transmission by UE 210 during corresponding second TTIs (e.g., during PUCCH sub-slots within the PUSCH slot) that are shorter in duration than the first TTI. Base station 205 may schedule UE 210 in accordance with the scheduling constraint that is based, at least in some aspects, on the uplink control transmission type for each of the multiple uplink control transmissions (e.g., UCIs). For example, base station 205 may identify or otherwise determine the uplink control transmission type for each of the multiple uplink control transmissions. Base station 205 may determine whether or not scheduling UE 210 with the multiple uplink control transmission satisfies or violates the scheduling constraint based on the transmission types (e.g., uplink control transmission types) of each uplink control transmission. If the scheduling constraint is satisfied, base station 205 may schedule UE 205 for the uplink data transmission 215 and the multiple uplink control transmissions overlapping with the uplink data transmission 215. If the scheduling constraint is not satisfied, base station 205 may avoid (e.g., may not) scheduling UE 205 with the multiple uplink control transmissions that overlap with the uplink data transmission 215.

UE 210 may determine or otherwise identify that the uplink data transmission 215 scheduled for transmission by UE 210 in the first TTI overlaps with the multiple uplink control transmissions also scheduled for transmission by UE 210 during their corresponding second TTIs that are shorter in duration than the first TTI. UE 210 may determine that the multiple uplink control transmission satisfy the scheduling constraint (e.g., based on the transmission type for each of the multiple uplink control transmissions) and, if so, multiplex the UCI with the data, and transmit the uplink data transmission 215 to convey both the data and the UCI.

For example, UE 210 may identify the uplink control transmission type for each of the multiple uplink control transmissions, and then determine whether or not the uplink control transmission types are different or the same. Based on this, UE 210 may determine whether the scheduling constraint is satisfied for the multiple uplink control transmissions. If the scheduling constraint the satisfied, UE 210 may transmit the uplink data transmission multiplexed with the UCI for transmission to base station 205. If the scheduling constraint is not satisfied, UE 210 may identify this as an error condition, and therefore skip transmission of the multiple uplink control transmissions and/or transmission of the uplink data transmission 215. If the error condition is detected, UE 210 may transmit a signal to base station 205 indicating that the scheduling constraint has been violated and/or that UE 210 will not be transmitting the multiple uplink control transmissions and/or the uplink data transmission. In another example, UE 210 may simply drop one or more of the uplink control transmissions in order to avoid violating the scheduling constraint.

Figure 3A:
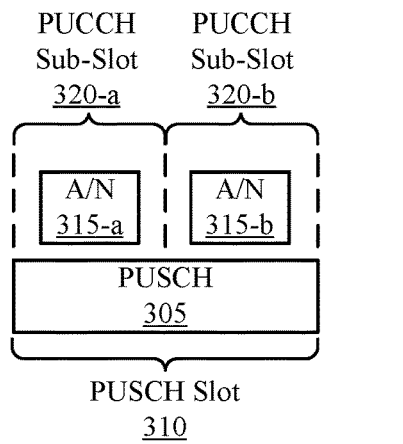
FIGS. 3A-3F illustrate examples of a scheduling configuration that supports UCI piggyback restrictions for URLLC in accordance with aspects of the present disclosure.
Figure 3B:
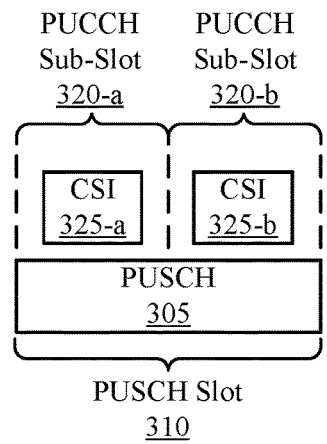

FIGS. 3A through 3F illustrate examples of a scheduling configuration 300 that supports UCI piggyback restrictions for URLLC in accordance with aspects of the present disclosure. In some examples, scheduling configuration 300 may implement aspects of wireless communication systems 100 and/or 200. Aspects of scheduling configuration 300 may be implemented by a UE and/or base station, which may be examples of the corresponding devices described herein. Broadly, FIGS. 3A-3F illustrate example scheduling configurations, with scheduling configurations 300-a and 300-b of FIGS. 3A and 3B illustrating scheduling configurations that do not satisfy (e.g., violate) the scheduling constraint and scheduling configurations 300-c, 300-d, 300-e, and 300-f of FIGS. 3B, 3C, 3D, 3E, and 3F, respectively, satisfying (e.g., complying with) the scheduling constraint.

A UE may be scheduled for an uplink data transmission 305 (e.g., a PUSCH transmission) during a first TTI 310 (e.g., a PUSCH slot). The uplink data transmission 305 may be scheduled by a base station using dynamic and/or semi-statically configured resources. For example, the base station may transmit a grant (e.g., a DCI grant) to the UE scheduling the uplink data transmission 305 and allocating appropriate resources. Additionally or alternatively, the uplink data transmission 305 may be scheduled by the UE. For example, the UE may have transmitted a SR, buffer status report (BSR), or some other indication that the UE has data to transmit in the uplink data transmission 305. The UE may then autonomously schedule the uplink data transmission 305 and/or may coordinate with the base station for scheduling the uplink data transmission 305.

The UE may also be scheduled to transmit multiple uplink control transmissions during corresponding second TTIs 320. Broadly, the second TTIs 320 may have a duration that is shorter in duration than the first TTI 310. In the illustrated example, there are two of the second TTIs 320 within the duration of one first TTI 310. However, it is to be understood that this example is non-limiting. For example, there may be 1.25, 1.5, 1.75, three, four, or some other number of second TTIs 320 within the duration of the first TTI 310. Moreover, the shorter duration of the second TTIs 320 may be such that they are noncontiguous within the first TTI 310. For example, the duration of the second TTIs 320 may span a number of symbols within the first TTI 310, but there may be gaps between consecutive second TTIs 320 within the first TTI 310. In some aspects, the duration of the second TTIs 320 may be configured for the UE in a configuration signal, such as an RRC configuration signal (e.g., using a subslotLength-ForPUCCH field).

In some aspects, the multiple uplink control transmissions scheduled for the UE may be scheduled autonomously by the UE and/or may be scheduled in coordination with the base station. Each of the multiple uplink control transmissions may have an associated transmission type. Examples of the transmission types for the multiple uplink control transmissions include, but are not limited to, an ACK/NACK (or A/N) transmission type 315, a CSI transmission type 320, a SR transmission type 330, and the like.

Aspects of the described techniques provide for a scheduling constraint to be defined and applied by the UE and/or base station when scheduling the multiple uplink control transmissions that overlap with the uplink data transmission 305. In this context, the overlap may refer to overlap in the time domain, e.g., the second TTIs 320 overlap in the time domain with the first TTI 310. In this situation, both the base station and UE may implement the scheduling constraint to ensure that the multiple uplink control transmissions overlapping with the uplink data transmission 305 satisfy (e.g., do not violate) the scheduling constraint. As the scheduling constraint is based, at least in some aspects, on the transmission type for each uplink control transmission of the multiple uplink control transmissions, the UE and/or base station may identify or otherwise determine each transmission type to determine whether the scheduling configuration satisfies the scheduling constraint. Broadly, scheduling configurations 300-a through 300-f illustrate examples scheduling configurations that satisfy or violate the scheduling constraint.

Scheduling configuration 300-a of FIG. 3A illustrates an example of a scheduling configuration that violates the scheduling constraint. Scheduling configuration 300-a includes a scheduling configuration where the transmission types (e.g., the uplink control transmission types) for the multiple (e.g., two in this example) uplink control transmissions are both ACK/NACK transmission types 315-a and 315-b. That is, scheduling configuration 300-a includes two ACK/NACK transmission types 315 being scheduled in the second TTIs 320-a and 320-b, respectively, for the UE. Second TTIs 320-a and 320-b overlap with the uplink data transmission 305 scheduled during the first TTI 310, which triggers consideration/application of the scheduling constraint. Since both the transmission types are the same (e.g., both are ACK/NACK transmission types 315) and/or since there are two ACK/NACK transmission type 315 in the multiple uplink control transmissions, this scenario violates the scheduling constraint. Accordingly, the base station may avoid scheduling the UE for the multiple uplink control transmissions according to scheduling configuration 300-a. In the situation where the UE determines that scheduling configuration 300-a has been scheduled for the UE, it may determine that this is an error condition. In this situation, the UE may ignore scheduling for/transmission of the multiple uplink control transmissions and/or the uplink data transmission 305.

Scheduling configuration 300-b of FIG. 3B illustrates an example of a scheduling configuration that violates the scheduling constraint. Scheduling configuration 300-b includes a scheduling configuration where the transmission types (e.g., the uplink control transmission types) for the multiple (e.g., two in this example) uplink control transmissions are both CSI transmission types 325-a and 325-b (e.g., channel performance feedback transmission types). That is, scheduling configuration 300-*b* includes two CSI transmission types 325 being scheduled in the second TTIs 320-*a* and 320-*b*, respectively, for the UE. Second TTIs 320-*a* and 320-*b* overlap with the uplink data transmission 305 scheduled during the first TTI 310, which triggers consideration/application of the scheduling constraint. Since both the transmission types are the same (e.g., both are CSI transmission types 325) and/or since there are two CSI transmission type 325 in the multiple uplink control transmissions, this scenario violates the scheduling constraint. Accordingly, the base station may avoid scheduling the UE for the multiple uplink control transmissions according to scheduling configuration 300-*b*. In the situation where the UE determines that scheduling configuration 300-*b* has been scheduled for the UE, it may determine that this is an error condition. In this situation, the UE may ignore scheduling for/transmission of the multiple uplink control transmissions and/or the uplink data transmission 305.

Figure 3C:
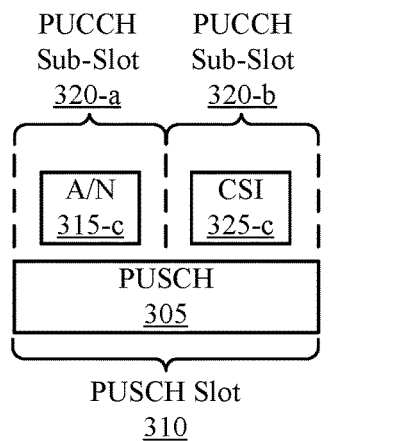

Scheduling configuration 300-*c* of FIG. 3C illustrates an example of a scheduling configuration that satisfies (e.g., does not violate) the scheduling constraint. Scheduling configuration 300-*c* includes a scheduling configuration where the transmission types (e.g., the uplink control transmission types) for the multiple (e.g., two in this example) uplink control transmissions are one ACK/NACK transmission type 315-*c* and one CSI transmission types 325-*c*. That is, scheduling configuration 300-*c* includes one ACK/NACK transmission type 315-*c* and one CSI transmission types 325-*c* being scheduled in the second TTIs 320-*a* and 320-*b*, respectively, for the UE. Second TTIs 320-*a* and 320-*b* overlap with the uplink data transmission 305 scheduled during the first TTI 310, which triggers consideration/application of the scheduling constraint. Since the transmission types are different (e.g., one ACK/NACK transmission type 315-*c* and one CSI transmission type 325-*c*) and/or since there are one ACK/NACK transmission type 315-*c* and one non-ACK/NACK transmission type 315 in the multiple uplink control transmissions, this scenario satisfies the scheduling constraint. Accordingly, the base station may schedule the UE for the multiple uplink control transmissions according to scheduling configuration 300-*c*. In the situation where the UE determines that scheduling configuration 300-*c* has been scheduled for the UE, it may determine that this satisfies the scheduling constraint. In this situation, the UE may multiplex the control information (UCI) into the uplink data transmission 305, and perform the uplink data transmission 305 accordingly.

Figure 3D:
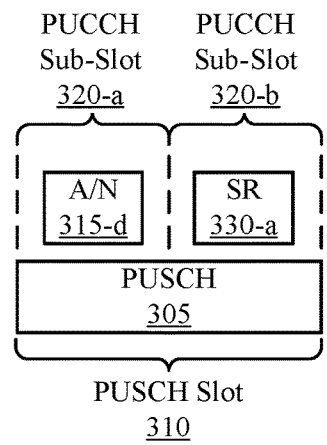

Scheduling configuration 300-*d* of FIG. 3D illustrates an example of a scheduling configuration that satisfies (e.g., does not violate) the scheduling constraint. Scheduling configuration 300-*d* includes a scheduling configuration where the transmission types (e.g., the uplink control transmission types) for the multiple (e.g., two in this example) uplink control transmissions are one ACK/NACK transmission type 315-*d* and one SR transmission types 330-*a*. That is, scheduling configuration 300-*d* includes one ACK/NACK transmission type 315-*d* and one SR transmission types 330-*a* being scheduled in the second TTIs 320-*a* and 320-*b*, respectively, for the UE. Second TTIs 320-*a* and 320-*b* overlap with the uplink data transmission 305 scheduled during the first TTI 310, which triggers consideration/application of the scheduling constraint. Since the transmission types are different (e.g., one ACK/NACK transmission type 315-*d* and one SR transmission type 330-*a*) and/or since there are one ACK/NACK transmission type 315-*d* and one non-ACK/NACK transmission type 315 in the multiple uplink control transmissions, this scenario satisfies the scheduling constraint. Accordingly, the base station may schedule the UE for the multiple uplink control transmissions according to scheduling configuration 300-*d*. In the situation where the UE determines that scheduling configuration 300-*d* has been scheduled for the UE, it may determine that this satisfies the scheduling constraint. In this situation, the UE may multiplex the control information (UCI) into the uplink data transmission 305, and perform the uplink data transmission 305 accordingly.

Figure 3E:
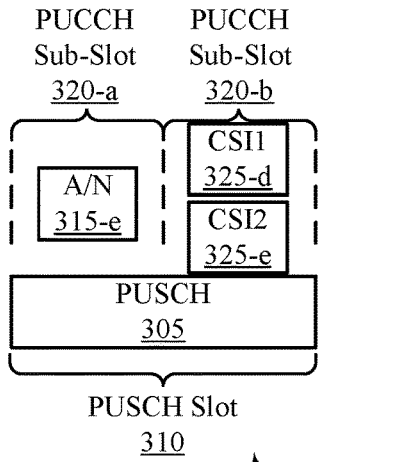

Scheduling configuration 300-*e* of FIG. 3E illustrates an example of a scheduling configuration that satisfies (e.g., does not violate) the scheduling constraint. Scheduling configuration 300-*e* includes a scheduling configuration where the transmission types (e.g., the uplink control transmission types) for the multiple (e.g., three in this example) uplink control transmissions are one ACK/NACK transmission type 315-*d* and two CSI transmission types 325-*d* and 325-*e*. That is, scheduling configuration 300-*e* includes one ACK/NACK transmission type 315-*e* and two CSI transmission types 325-*d* and 325-*e* being scheduled in the second TTIs 320-*a* and 320-*b*, respectively, for the UE. In this case, although there are two CSI transmission types 325 (e.g., CSI reports) overlapping (e.g., colliding) with the uplink data transmission 305 (e.g., PUSCH), the scheduling constraint is satisfied. Second TTIs 320-*a* and 320-*b* overlap with the uplink data transmission 305 scheduled during the first TTI 310, which triggers consideration/application of the scheduling constraint. Since the transmission types are different (e.g., one ACK/NACK transmission type 315-*e* and two CSI transmission type 325-*d* and 325-*e*) and/or since there are one ACK/NACK transmission type 315-*e* and one non-ACK/NACK transmission type 315 in the multiple uplink control transmissions, this scenario satisfies the scheduling constraint. Accordingly, the base station may schedule the UE for the multiple uplink control transmissions according to scheduling configuration 300-*e*. In the situation where the UE determines that scheduling configuration 300-*e* has been scheduled for the UE, it may determine that this satisfies the scheduling constraint. In this situation, the UE may multiplex the control information (UCI) into the uplink data transmission 305, and perform the uplink data transmission 305 accordingly.

Figure 3F:
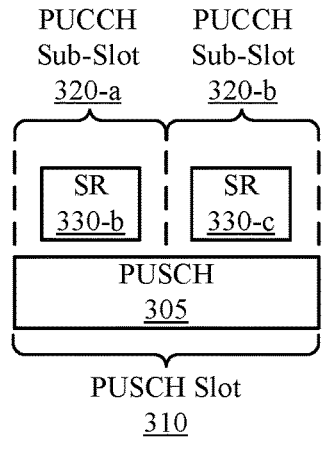

Scheduling configuration 300-*f* of FIG. 3F illustrates an example of a scheduling configuration that satisfies (e.g., does not violate) the scheduling constraint. Scheduling configuration 300-*f* includes a scheduling configuration where the transmission types (e.g., the uplink control transmission types) for the multiple (e.g., two in this example) uplink control transmissions are two SR transmission type 330-*b* and 330-*c*. That is, scheduling configuration 300-*f* includes two SR transmission type 330-*b* and 330-*c* being scheduled in the second TTIs 320-*a* and 320-*b*, respectively, for the UE. Second TTIs 320-*a* and 320-*b* overlap with the uplink data transmission 305 scheduled during the first TTI 310, which triggers consideration/application of the scheduling constraint. Since the transmission types are both SR transmission type 330 in the multiple uplink control transmissions, this scenario satisfies the scheduling constraint. Accordingly, the base station may schedule the UE for the multiple uplink control transmissions according to scheduling configuration 300-*f*. In the situation where the UE determines that scheduling configuration 300-*f* has been scheduled for the UE, it may determine that this satisfies the scheduling constraint. In this situation, the UE may perform the uplink data transmission 305 accordingly. This case is allowed (e.g., satisfies the scheduling constraint) because, although the two UCIs are of the same transmission type, they are both SR transmission types 330 and can be given special treatment under the scheduling constraint.

In some aspects, scheduling configuration 300-*f* illustrates a special case can be allowed according to the scheduling constraint. The special case may be when the uplink data transmission 305 the scheduled for the UE that overlaps with the multiple SR uplink control transmissions on respective PUCCH sub slots. One reason why this may be allowed is that the UE may not multiplex the control information (e.g., the SR) onto the uplink data transmission 305 (e.g., PUSCH). In some aspects, the special case may assume that the SR and PUSCH have the same priority. In some aspects, if the uplink data transmission 305 contains uplink scheduled data, than the UE may drop the SR in this case, e.g., since the UE may transmit the BSR on PUSCH if needed. If the uplink data transmission 305 does not contain any uplink scheduled data, than the UE may simply drop the PUSCH transmission. Accordingly, the special case may enable the same transmission types in the uplink control transmissions, but without violating the scheduling constraint.

Figure 4:
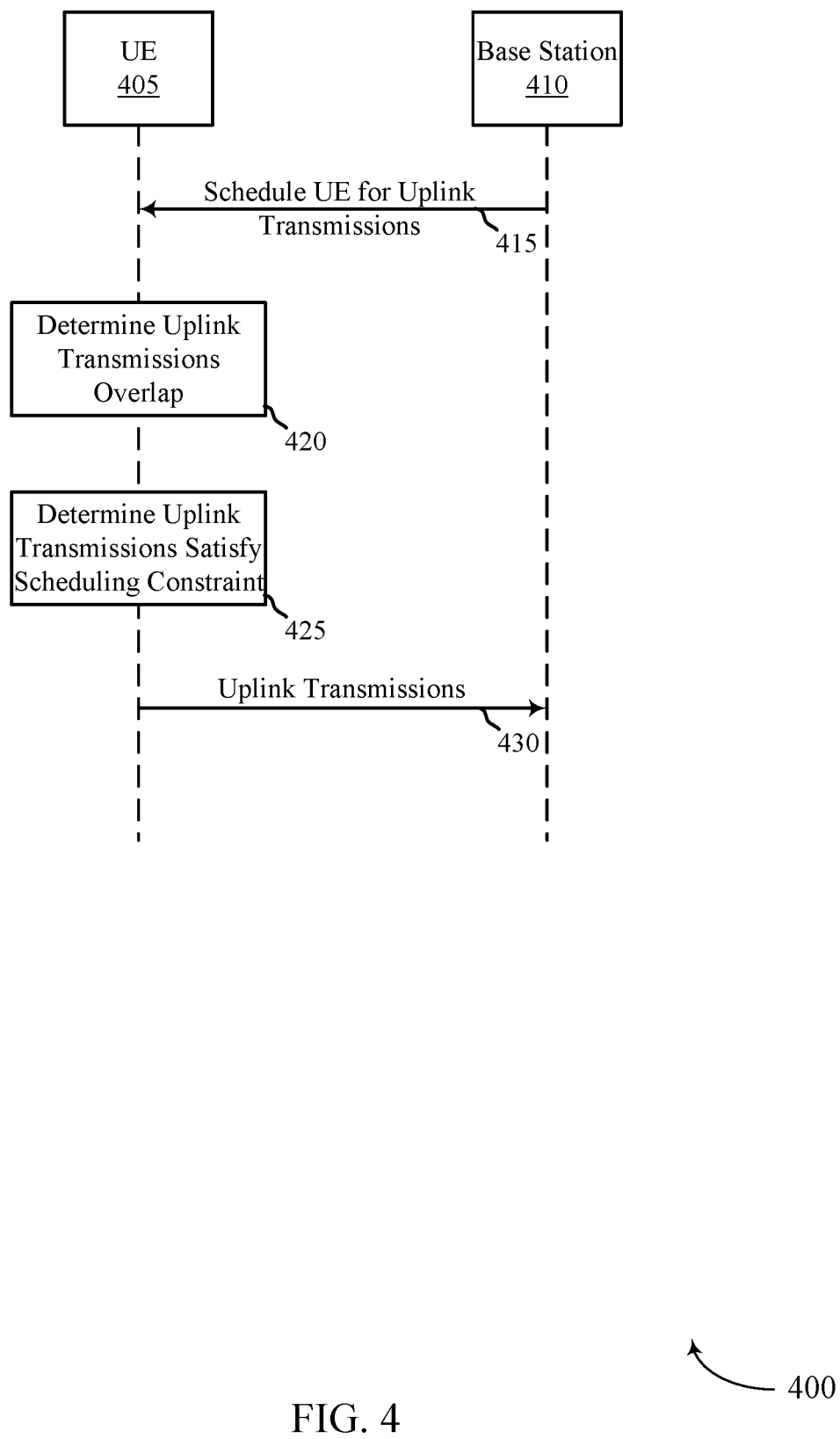
FIG. 4 illustrates an example of a process that supports UCI piggyback restrictions for URLLC in accordance with aspects of the present disclosure.

FIG. 4 illustrates an example of a process 400 that supports UCI piggyback restrictions for URLLC in accordance with aspects of the present disclosure. In some examples, process 400 may implement aspects of wireless communication systems 100 and/or 200, and/or scheduling configuration 300. Process 400 may be implemented by UE 405 and/or base station 410, which may be examples of corresponding devices described herein.

At 415, base station 410 may optionally schedule UE 405 for uplink transmissions. The uplink transmissions may include an uplink data transmission for transmission in a first TTI that overlaps with multiple uplink control transmissions during corresponding second TTIs. In some aspects, the second TTIs are shorter in duration (e.g., in the time domain) than the first TTI. In some aspects, scheduling the UE with the multiple uplink control transmissions may be done in accordance with a scheduling constraint defined for UE 405 and base station 410. Broadly, the scheduling constraint may be based on the uplink control transmission type (or simply transmission type) for the multiple uplink control transmissions overlapping with the uplink data transmission.

For example, base station 410 may identify the transmission type for each of the multiple uplink control transmissions and determine whether the multiple uplink control transmissions satisfy the scheduling constraint based on the transmission types. Broadly, the scheduling constraint may be satisfied when the transmission types associated with the multiple uplink control transmissions are different. In another sense, the scheduling constraint may not be satisfied (e.g., may be violated) when the transmission types for the multiple uplink control transmissions are the same (e.g., except for the special case discussed above regarding the SR transmission types). More particularly, the scheduling constraint may not be satisfied when there are two ACK/NACK transmission types in the multiple uplink control transmissions. Similarly, the scheduling constraint may not be satisfied when there are two channel performance feedback (e.g., CSI) transmission types in separate second TTIs in the multiple uplink transmissions.

In one example, different transmission types for the multiple uplink control transmissions may satisfy the scheduling constraint. For example, an ACK/NACK and a non-ACK/NACK transmission type may satisfy the scheduling constraint. In another example, a channel performance feedback transmission type and a non-channel performance feedback transmission type (e.g., a CSI and a non-CSI transmission type) may satisfy the scheduling constraint.

In another example, the same transmission types for the multiple uplink control transmissions may satisfy the scheduling constraint. For example, two SR transmission types for the multiple uplink control transmissions may satisfy the scheduling constraint.

Accordingly, at 420 UE 405 may identify or otherwise determine that the uplink data transmission has been scheduled for transmission in the first TTI that overlaps with multiple uplink control transmissions during the second TTIs. As discussed, the duration of the second TTIs may be shorter than the duration of the first TTI.

At 425, UE 405 and determine that the multiple uplink control transmissions satisfy the scheduling constraint, e.g., based on the transmission type for the multiple uplink control transmissions that overlap with the uplink data transmission. For example, UE 405 may implement the same scheduling constraint considerations discussed with reference to base station 410 in determining whether the multiple uplink control transmissions that overlap with the uplink data transmission satisfy the scheduling constraint. In the example illustrated in process 400, it is assumed that the scheduling constraint satisfied.

Accordingly and at 430, UE 405 may transmit (and base station 410 may receive) the uplink data transmission and the multiple uplink control transmissions based on the scheduling constraint being satisfied. For example, UE 405 may multiplex the control information being conveyed in the multiple uplink control transmissions into the uplink data transmission before transmitting the multiplexed information to base station 410. In another example, UE 405 may not need to multiplex the control information, e.g., when the transmission type includes an SR transmission type.

Accordingly, process 400 illustrates an example where UE 405 and base station 410 may adopt the scheduling constraint described herein when scheduling multiple uplink control transmissions that overlap with an uplink data transmission.

Figure 5:
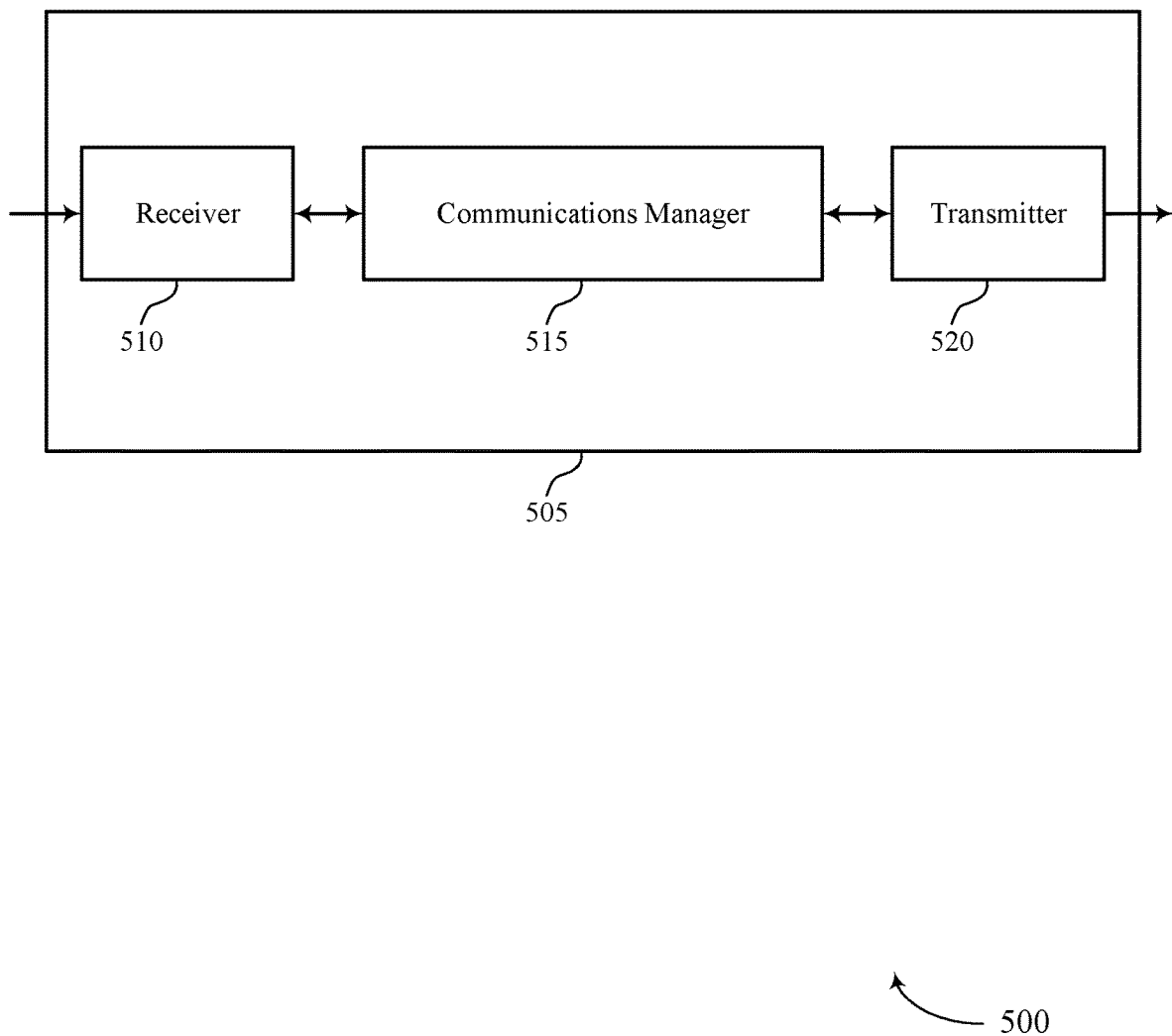
FIGS. 5 and 6 show block diagrams of devices that support UCI piggyback restrictions for URLLC in accordance with aspects of the present disclosure.

FIG. 5 shows a block diagram 500 of a device 505 that supports UCI piggyback restrictions for URLLC in accordance with aspects of the present disclosure. The device 505 may be an example of aspects of a UE 115 as described herein. The device 505 may include a receiver 510, a communications manager 515, and a transmitter 520. The device 505 may also include a processor. Each of these components may be in communication with one another (e.g., via one or more buses).

The receiver 510 may receive information such as packets, user data, or control information associated with various information channels (e.g., control channels, data channels, and information related to UCI piggyback restrictions for URLLC, etc.). Information may be passed on to other components of the device 505. The receiver 510 may be an example of aspects of the transceiver 820 described with reference to FIG. 8. The receiver 510 may utilize a single antenna or a set of antennas.

The communications manager 515 may identify that an uplink data transmission scheduled for transmission by the UE in a first transmission time interval overlaps with multiple uplink control transmissions also scheduled for transmission by the UE during corresponding second transmission time intervals that are shorter in duration than the first transmission time interval, determine that the multiple uplink control transmissions satisfy a scheduling constraint that is based on an uplink control transmission type of the multiple uplink control transmissions that overlap with the uplink data transmission, and transmit the uplink data transmission and the multiple uplink control transmissions based on the scheduling constraint being satisfied. The communications manager 515 may be an example of aspects of the communications manager 810 described herein.

The communications manager 515, or its sub-components, may be implemented in hardware, code (e.g., software or firmware) executed by a processor, or any combination thereof. If implemented in code executed by a processor, the functions of the communications manager 515, or its sub-components may be executed by a general-purpose processor, a digital signal processor (DSP), an application-specific integrated circuit (ASIC), a field-programmable gate array (FPGA) or other programmable logic device, discrete gate or transistor logic, discrete hardware components, or any combination thereof designed to perform the functions described in the present disclosure.

The communications manager 515, or its sub-components, may be physically located at various positions, including being distributed such that portions of functions are implemented at different physical locations by one or more physical components. In some examples, the communications manager 515, or its sub-components, may be a separate and distinct component in accordance with various aspects of the present disclosure. In some examples, the communications manager 515, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 520 may transmit signals generated by other components of the device 505. In some examples, the transmitter 520 may be collocated with a receiver 510 in a transceiver module. For example, the transmitter 520 may be an example of aspects of the transceiver 820 described with reference to FIG. 8. The transmitter 520 may utilize a single antenna or a set of antennas.

Figure 6:
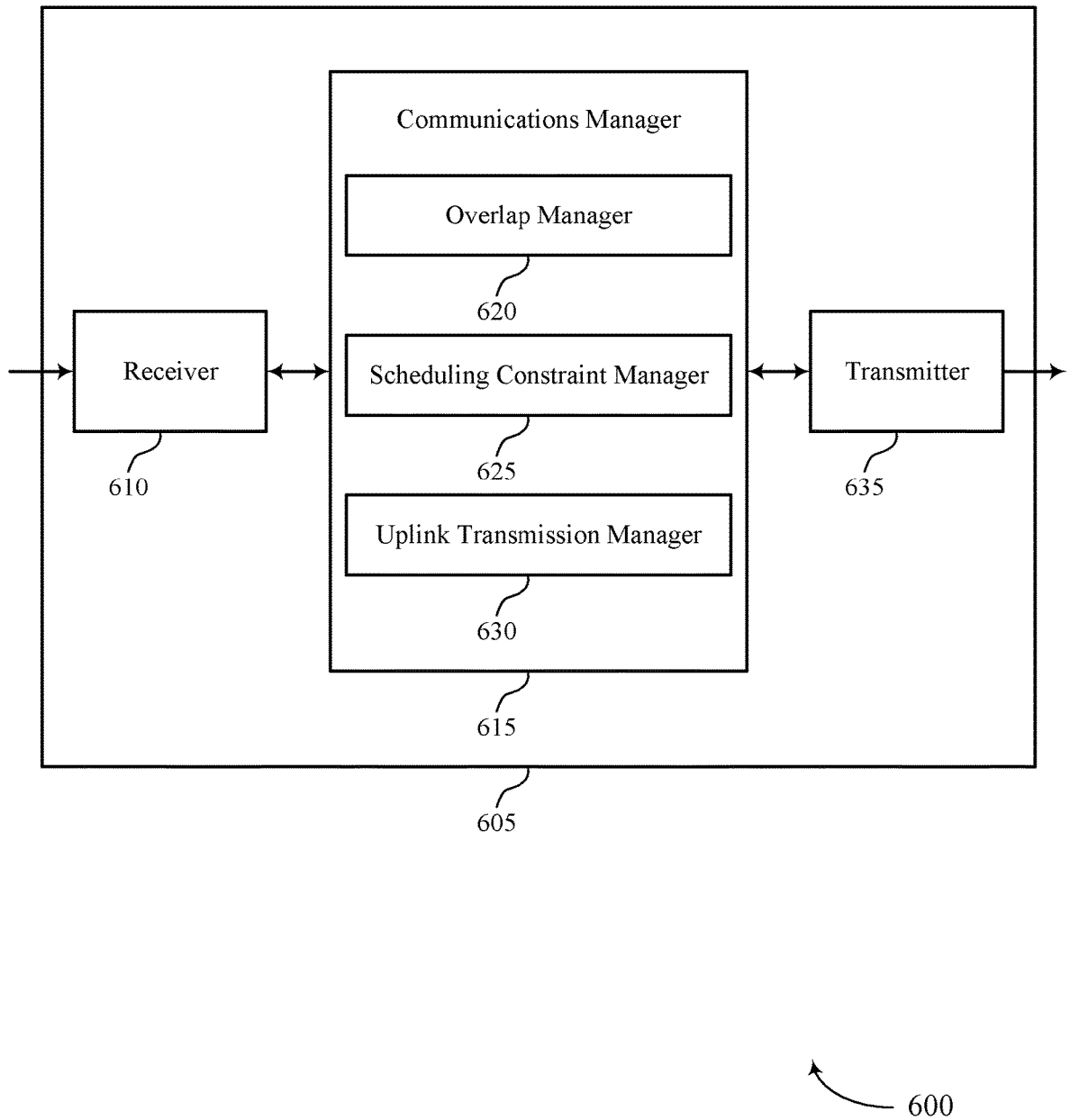

FIG. 6 shows a block diagram 600 of a device 605 that supports UCI piggyback restrictions for URLLC in accordance with aspects of the present disclosure. The device 605 may be an example of aspects of a device 505, or a UE 115 as described herein. The device 605 may include a receiver 610, a communications manager 615, and a transmitter 635. The device 605 may also include a processor. Each of these components may be in communication with one another (e.g., via one or more buses).

The receiver 610 may receive information such as packets, user data, or control information associated with various information channels (e.g., control channels, data channels, and information related to UCI piggyback restrictions for URLLC, etc.). Information may be passed on to other components of the device 605. The receiver 610 may be an example of aspects of the transceiver 820 described with reference to FIG. 8. The receiver 610 may utilize a single antenna or a set of antennas.

The communications manager 615 may be an example of aspects of the communications manager 515 as described herein. The communications manager 615 may include an overlap manager 620, a scheduling constraint manager 625, and an uplink transmission manager 630. The communications manager 615 may be an example of aspects of the communications manager 810 described herein.

The overlap manager 620 may identify that an uplink data transmission scheduled for transmission by the UE in a first transmission time interval overlaps with multiple uplink control transmissions also scheduled for transmission by the UE during corresponding second transmission time intervals that are shorter in duration than the first transmission time interval.

The scheduling constraint manager 625 may determine that the multiple uplink control transmissions satisfy a scheduling constraint that is based on an uplink control transmission type of the multiple uplink control transmissions that overlap with the uplink data transmission.

The uplink transmission manager 630 may transmit the uplink data transmission and the multiple uplink control transmissions based on the scheduling constraint being satisfied.

The transmitter 635 may transmit signals generated by other components of the device 605. In some examples, the transmitter 635 may be collocated with a receiver 610 in a transceiver module. For example, the transmitter 635 may be an example of aspects of the transceiver 820 described with reference to FIG. 8. The transmitter 635 may utilize a single antenna or a set of antennas.

Figure 7:
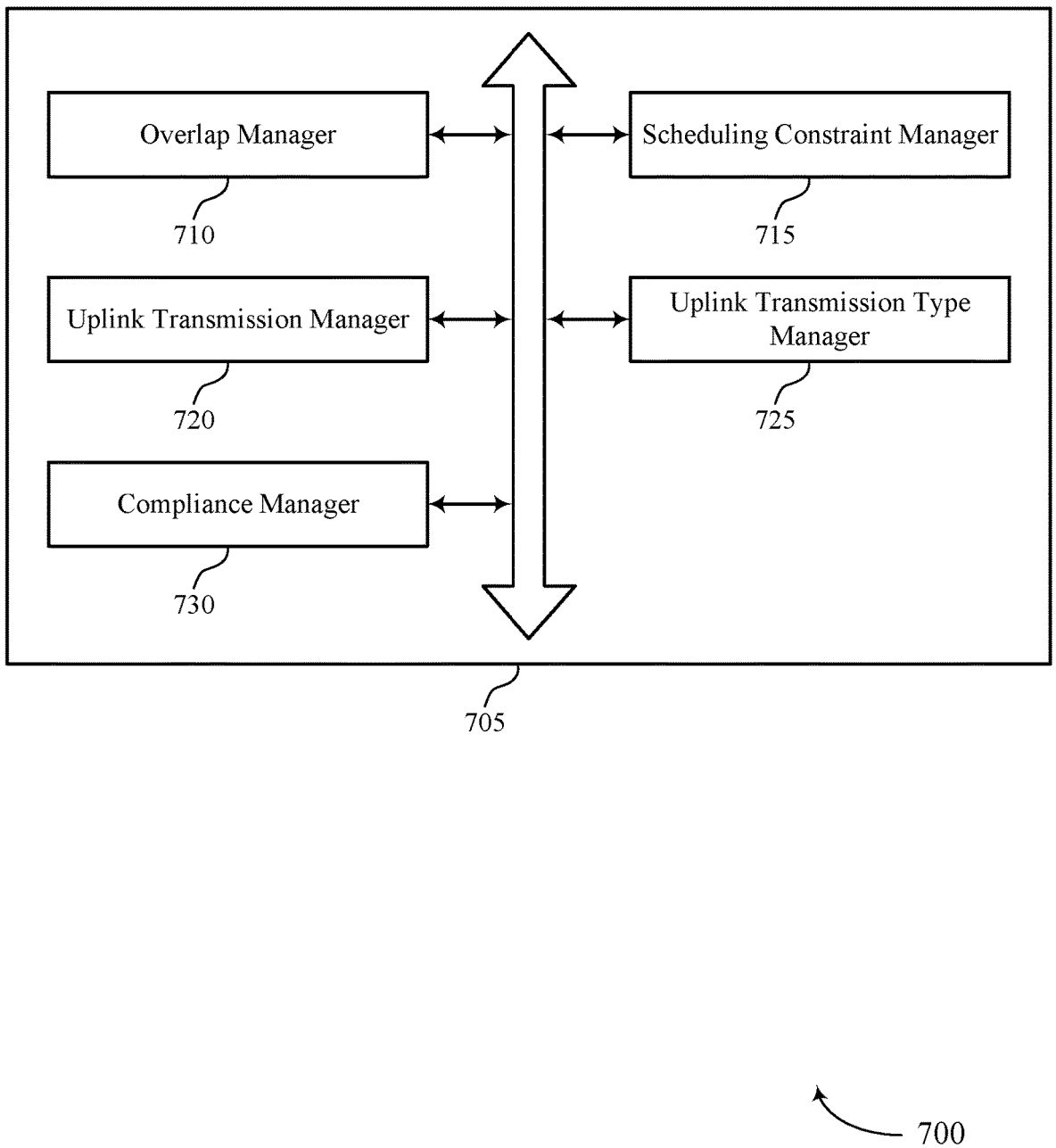
FIG. 7 shows a block diagram of a communications manager that supports UCI piggyback restrictions for URLLC in accordance with aspects of the present disclosure.

FIG. 7 shows a block diagram 700 of a communications manager 705 that supports UCI piggyback restrictions for URLLC in accordance with aspects of the present disclosure. The communications manager 705 may be an example of aspects of a communications manager 515, a communications manager 615, or a communications manager 810 described herein. The communications manager 705 may include an overlap manager 710, a scheduling constraint manager 715, an uplink transmission manager 720, an uplink transmission type manager 725, and a compliance manager 730. Each of these modules may communicate, directly or indirectly, with one another (e.g., via one or more buses).

The overlap manager 710 may identify that an uplink data transmission scheduled for transmission by the UE in a first transmission time interval overlaps with multiple uplink control transmissions also scheduled for transmission by the UE during corresponding second transmission time intervals that are shorter in duration than the first transmission time interval.

The scheduling constraint manager 715 may determine that the multiple uplink control transmissions satisfy a scheduling constraint that is based on an uplink control transmission type of the multiple uplink control transmissions that overlap with the uplink data transmission. In some cases, the scheduling constraint is satisfied when the uplink control transmission type associated with each of the multiple uplink control transmissions of the corresponding second transmission time intervals are different. In some cases, the scheduling constraint is not satisfied when at least two of the uplink control transmission type associated with each of the multiple uplink control transmissions of the corresponding second transmission time intervals are the same.

In some cases, the scheduling constraint is not satisfied when at least two of the multiple uplink control transmissions are of an ACK/NACK transmission type. In some cases, the scheduling constraint is not satisfied when at least two of the multiple uplink control transmissions are of a channel performance feedback transmission type.

The uplink transmission manager 720 may transmit the uplink data transmission and the multiple uplink control transmissions based on the scheduling constraint being satisfied.

The uplink transmission type manager 725 may identify an uplink control transmission type for each of the multiple uplink control transmissions. In some examples, the uplink transmission type manager 725 may determine that the uplink control transmission types are different for the multiple uplink control transmissions. In some examples, the uplink transmission type manager 725 may determine that the multiple uplink control transmissions satisfy the scheduling constraint based on the different uplink control transmission type. In some cases, the different uplink control transmission type includes an ACK/NACK transmission type and a non-ACK/NACK transmission type. In some cases, the different uplink control transmission type includes a channel performance feedback transmission type and a non-channel performance feedback transmission type.

The compliance manager 730 may identify an uplink control transmission type for each of the multiple uplink control transmissions. In some examples, the compliance manager 730 may determine that the uplink control transmission types are the same for the multiple uplink control transmissions. In some examples, the compliance manager 730 may determine that the multiple uplink control transmissions satisfy the scheduling constraint based on the same uplink control transmission type. In some cases, the same uplink control transmission type includes a scheduling request transmission type.

Figure 8:
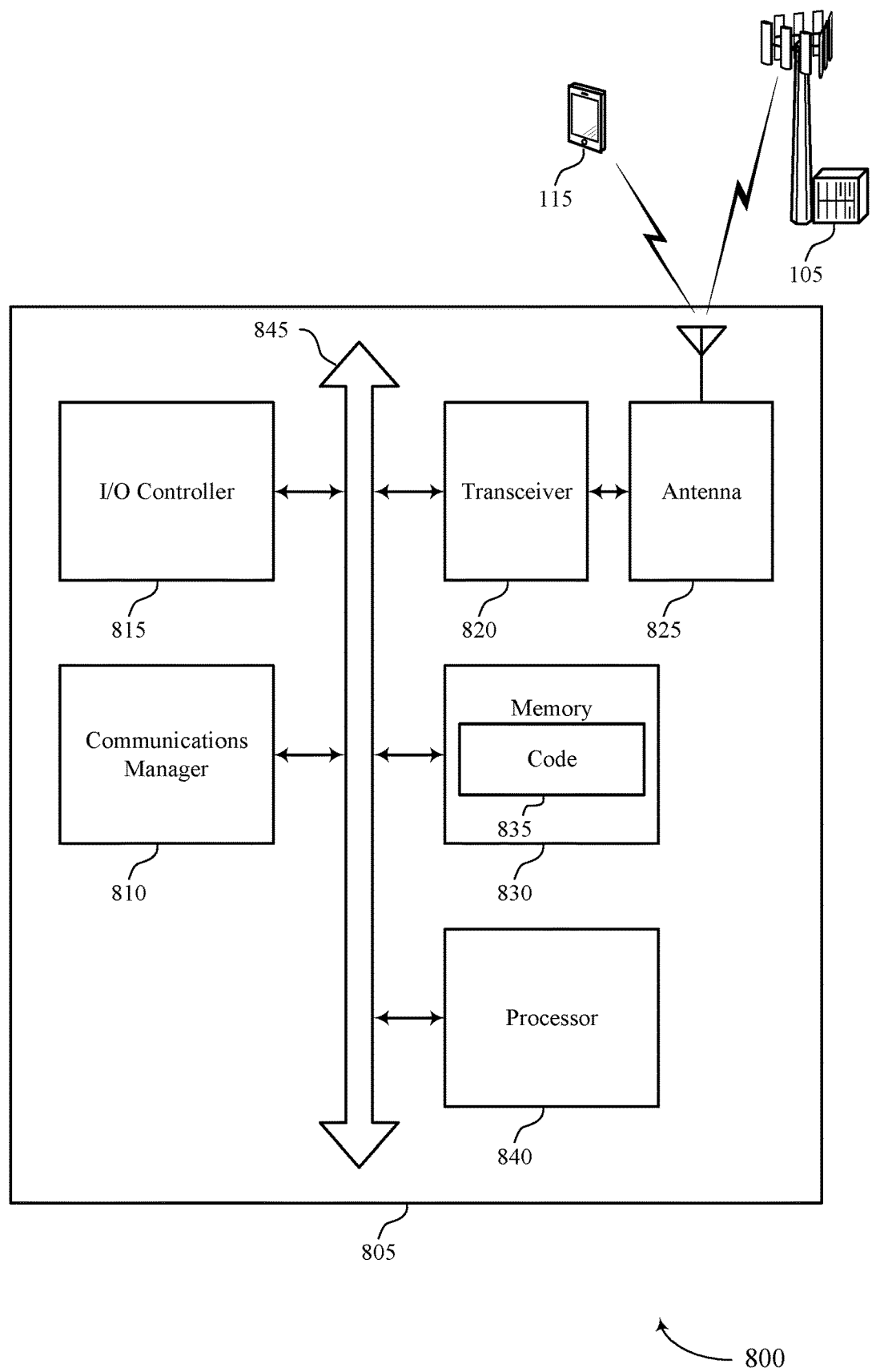
FIG. 8 shows a diagram of a system including a device that supports UCI piggyback restrictions for URLLC in accordance with aspects of the present disclosure.

FIG. 8 shows a diagram of a system 800 including a device 805 that supports UCI piggyback restrictions for URLLC in accordance with aspects of the present disclosure. The device 805 may be an example of or include the components of device 505, device 605, or a UE 115 as described herein. The device 805 may include components for bi-directional voice and data communications including components for transmitting and receiving communications, including a communications manager 810, an I/O controller 815, a transceiver 820, an antenna 825, memory 830, and a processor 840. These components may be in electronic communication via one or more buses (e.g., bus 845).

The communications manager 810 may identify that an uplink data transmission scheduled for transmission by the UE in a first transmission time interval overlaps with multiple uplink control transmissions also scheduled for transmission by the UE during corresponding second transmission time intervals that are shorter in duration than the first transmission time interval, determine that the multiple uplink control transmissions satisfy a scheduling constraint that is based on an uplink control transmission type of the multiple uplink control transmissions that overlap with the uplink data transmission, and transmit the uplink data transmission and the multiple uplink control transmissions based on the scheduling constraint being satisfied.

The I/O controller 815 may manage input and output signals for the device 805. The I/O controller 815 may also manage peripherals not integrated into the device 805. In some cases, the I/O controller 815 may represent a physical connection or port to an external peripheral. In some cases, the I/O controller 815 may utilize an operating system such as iOS®, ANDROID®, MS-DOS®, MS-WINDOWS®, OS/2®, UNIX®, LINUX®, or another known operating system. In other cases, the I/O controller 815 may represent or interact with a modem, a keyboard, a mouse, a touchscreen, or a similar device. In some cases, the I/O controller 815 may be implemented as part of a processor. In some cases, a user may interact with the device 805 via the I/O controller 815 or via hardware components controlled by the I/O controller 815.

The transceiver 820 may communicate bi-directionally, via one or more antennas, wired, or wireless links as described above. For example, the transceiver 820 may represent a wireless transceiver and may communicate bi-directionally with another wireless transceiver. The transceiver 820 may also include a modem to modulate the packets and provide the modulated packets to the antennas for transmission, and to demodulate packets received from the antennas.

In some cases, the wireless device may include a single antenna 825. However, in some cases the device may have more than one antenna 825, which may be capable of concurrently transmitting or receiving multiple wireless transmissions.

The memory 830 may include random access memory (RAM) and read-only memory (ROM). The memory 830 may store computer-readable, computer-executable code 835 including instructions that, when executed, cause the processor to perform various functions described herein. In some cases, the memory 830 may contain, among other things, a basic input/output system (BIOS) which may control basic hardware or software operation such as the interaction with peripheral components or devices.

The processor 840 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 840 may be configured to operate a memory array using a memory controller. In other cases, a memory controller may be integrated into the processor 840. The processor 840 may be configured to execute computer-readable instructions stored in a memory (e.g., the memory 830) to cause the device 805 to perform various functions (e.g., functions or tasks supporting UCI piggyback restrictions for URLLC).

The code 835 may include instructions to implement aspects of the present disclosure, including instructions to support wireless communications. The code 835 may be stored in a non-transitory computer-readable medium such as system memory or other type of memory. In some cases, the code 835 may not be directly executable by the processor 840 but may cause a computer (e.g., when compiled and executed) to perform functions described herein.

Figure 9:
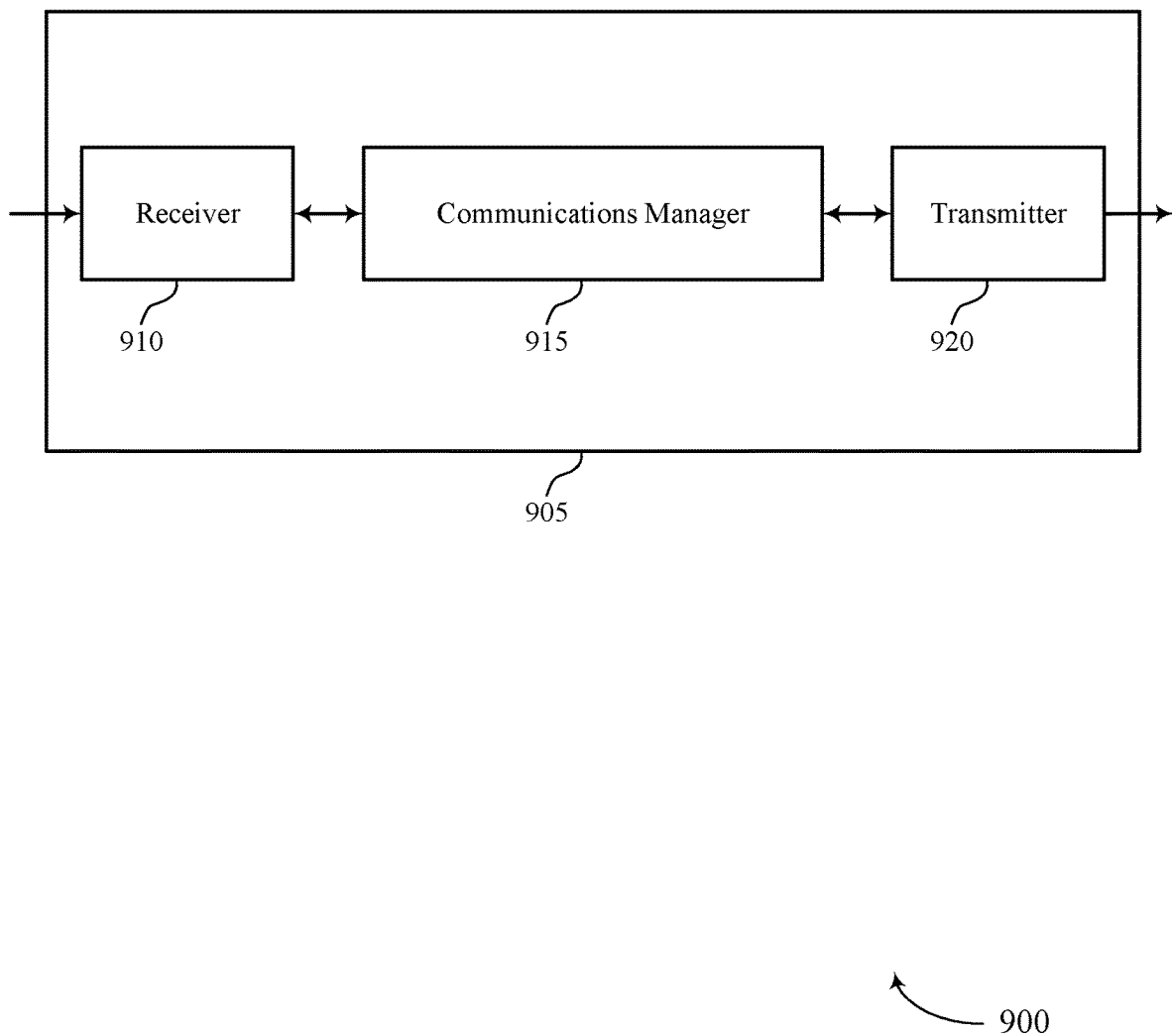
FIGS. 9 and 10 show block diagrams of devices that support UCI piggyback restrictions for URLLC in accordance with aspects of the present disclosure.

FIG. 9 shows a block diagram 900 of a device 905 that supports UCI piggyback restrictions for URLLC in accordance with aspects of the present disclosure. The device 905 may be an example of aspects of a base station 105 as described herein. The device 905 may include a receiver 910, a communications manager 915, and a transmitter 920. The device 905 may also include a processor. Each of these components may be in communication with one another (e.g., via one or more buses).

The receiver 910 may receive information such as packets, user data, or control information associated with various information channels (e.g., control channels, data channels, and information related to UCI piggyback restrictions for URLLC, etc.). Information may be passed on to other components of the device 905. The receiver 910 may be an example of aspects of the transceiver 1220 described with reference to FIG. 12. The receiver 910 may utilize a single antenna or a set of antennas.

The communications manager 915 may schedule an uplink data transmission for transmission by a UE in a first transmission time interval that overlaps with multiple uplink control transmissions also scheduled for transmission by the UE during corresponding second transmission time intervals that are shorter in duration than the first transmission time interval, the multiple uplink control transmissions satisfying a scheduling constraint that is based on an uplink control transmission type of the multiple uplink control transmissions that overlap with the uplink data transmission and receive the uplink data transmission and the multiple uplink control transmissions based on the scheduling constraint being satisfied. The communications manager 915 may be an example of aspects of the communications manager 1210 described herein.

The communications manager 915, or its sub-components, may be implemented in hardware, code (e.g., software or firmware) executed by a processor, or any combination thereof. If implemented in code executed by a processor, the functions of the communications manager 915, or its sub-components may be executed by a general-purpose processor, a DSP, an ASIC, a FPGA or other programmable logic device, discrete gate or transistor logic, discrete hardware components, or any combination thereof designed to perform the functions described in the present disclosure.

The communications manager 915, or its sub-components, may be physically located at various positions, including being distributed such that portions of functions are implemented at different physical locations by one or more physical components. In some examples, the communications manager 915, or its sub-components, may be a separate and distinct component in accordance with various aspects of the present disclosure. In some examples, the communications manager 915, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 920 may transmit signals generated by other components of the device 905. In some examples, the transmitter 920 may be collocated with a receiver 910 in a transceiver module. For example, the transmitter 920 may be an example of aspects of the transceiver 1220 described with reference to FIG. 12. The transmitter 920 may utilize a single antenna or a set of antennas.

Figure 10:
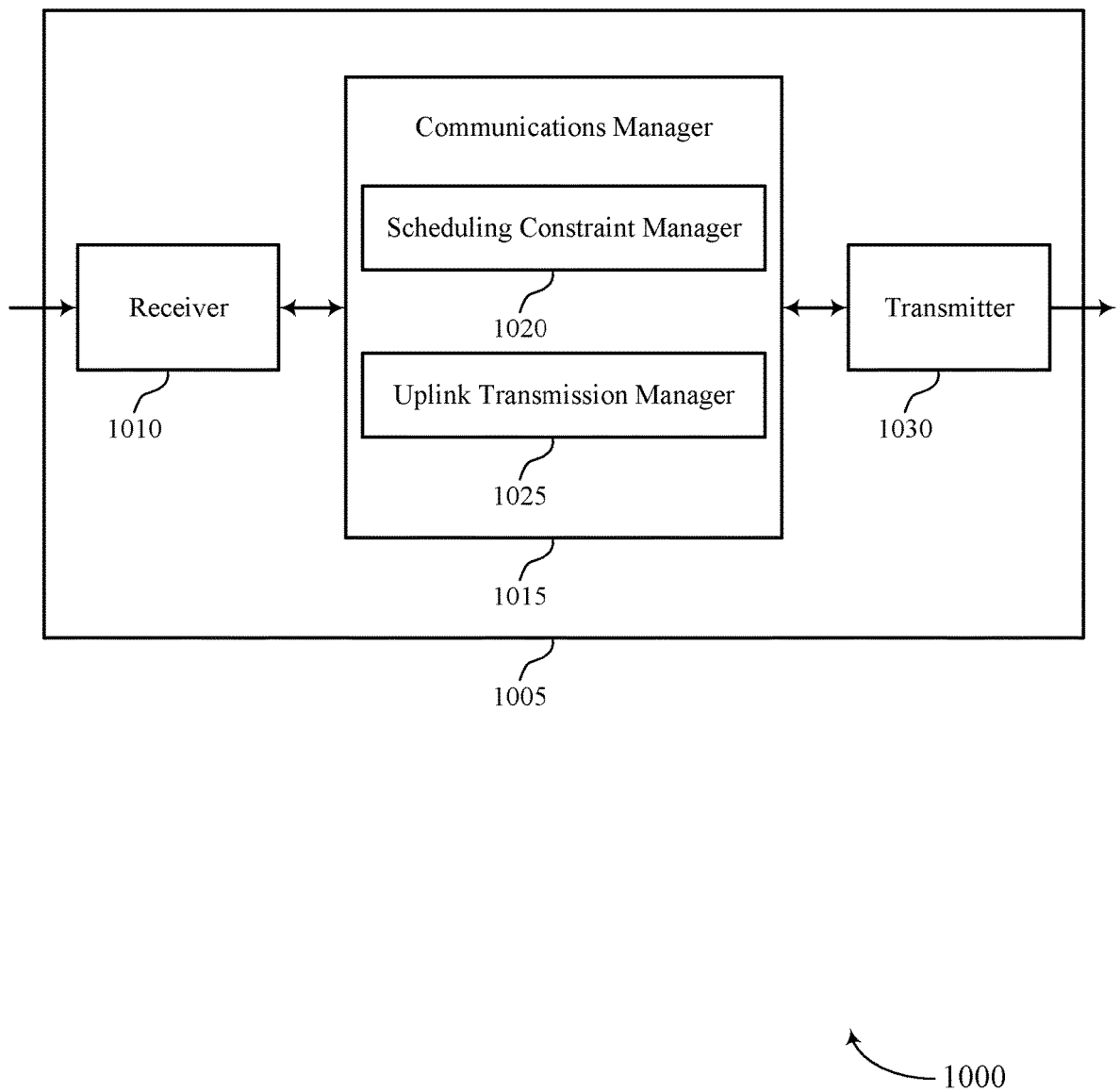

FIG. 10 shows a block diagram 1000 of a device 1005 that supports UCI piggyback restrictions for URLLC in accordance with aspects of the present disclosure. The device 1005 may be an example of aspects of a device 905, or a base station 105 as described herein. The device 1005 may include a receiver 1010, a communications manager 1015, and a transmitter 1030. The device 1005 may also include a processor. Each of these components may be in communication with one another (e.g., via one or more buses).

The receiver 1010 may receive information such as packets, user data, or control information associated with various information channels (e.g., control channels, data channels, and information related to UCI piggyback restrictions for URLLC, etc.). Information may be passed on to other components of the device 1005. The receiver 1010 may be an example of aspects of the transceiver 1220 described with reference to FIG. 12. The receiver 1010 may utilize a single antenna or a set of antennas.

The communications manager 1015 may be an example of aspects of the communications manager 915 as described herein. The communications manager 1015 may include a scheduling constraint manager 1020 and an uplink transmission manager 1025. The communications manager 1015 may be an example of aspects of the communications manager 1210 described herein.

The scheduling constraint manager 1020 may schedule an uplink data transmission for transmission by a UE in a first transmission time interval that overlaps with multiple uplink control transmissions also scheduled for transmission by the UE during corresponding second transmission time intervals that are shorter in duration than the first transmission time interval, the multiple uplink control transmissions satisfying a scheduling constraint that is based on an uplink control transmission type of the multiple uplink control transmissions that overlap with the uplink data transmission.

The uplink transmission manager 1025 may receive the uplink data transmission and the multiple uplink control transmissions based on the scheduling constraint being satisfied.

The transmitter 1030 may transmit signals generated by other components of the device 1005. In some examples, the transmitter 1030 may be collocated with a receiver 1010 in a transceiver module. For example, the transmitter 1030 may be an example of aspects of the transceiver 1220 described with reference to FIG. 12. The transmitter 1030 may utilize a single antenna or a set of antennas.

Figure 11:
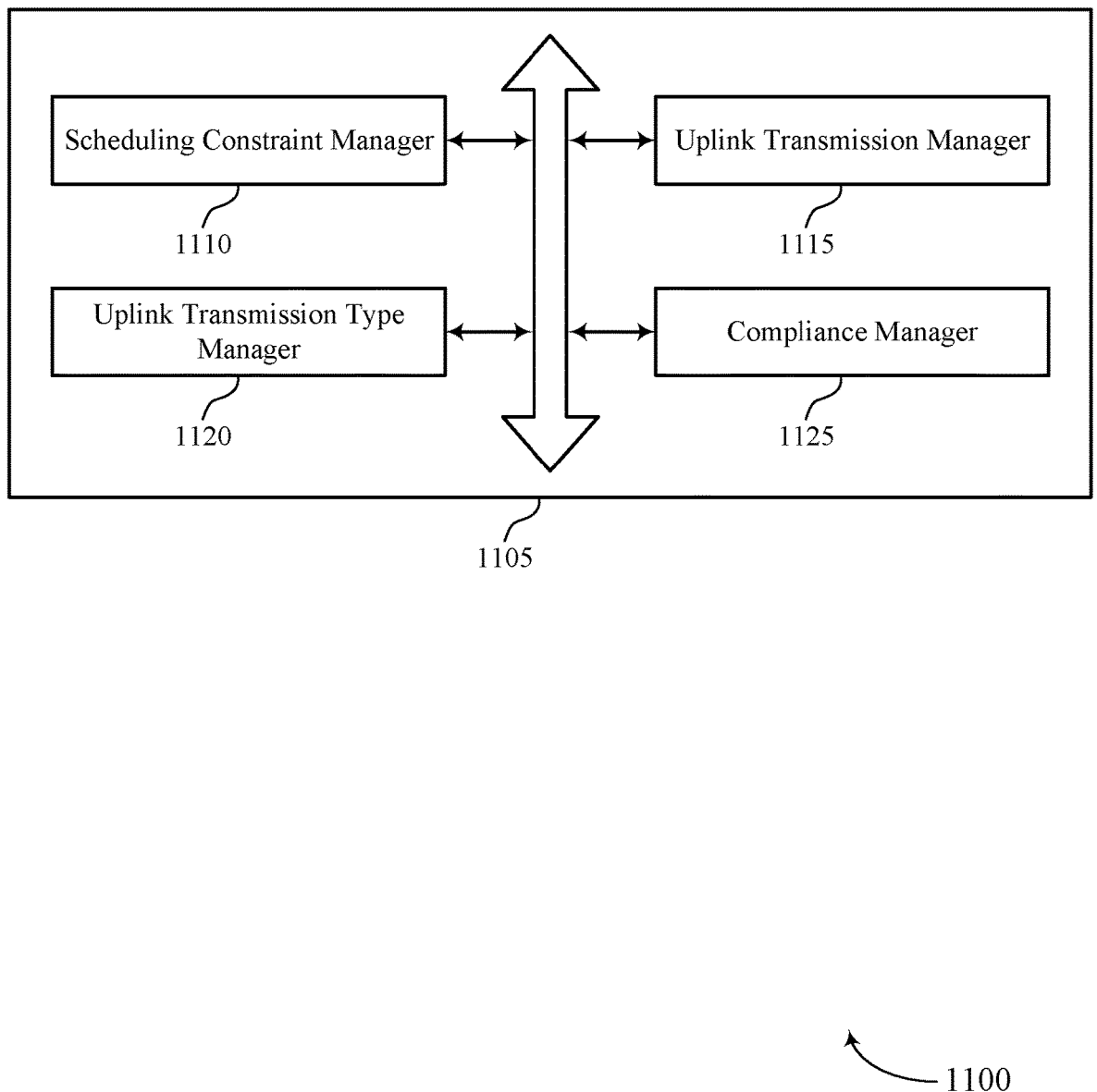
FIG. 11 shows a block diagram of a communications manager that supports UCI piggyback restrictions for URLLC in accordance with aspects of the present disclosure.

FIG. 11 shows a block diagram 1100 of a communications manager 1105 that supports UCI piggyback restrictions for URLLC in accordance with aspects of the present disclosure. The communications manager 1105 may be an example of aspects of a communications manager 915, a communications manager 1015, or a communications manager 1210 described herein. The communications manager 1105 may include a scheduling constraint manager 1110, an uplink transmission manager 1115, an uplink transmission type manager 1120, and a compliance manager 1125. Each of these modules may communicate, directly or indirectly, with one another (e.g., via one or more buses).

The scheduling constraint manager 1110 may schedule an uplink data transmission for transmission by a UE in a first transmission time interval that overlaps with multiple uplink control transmissions also scheduled for transmission by the UE during corresponding second transmission time intervals that are shorter in duration than the first transmission time interval, the multiple uplink control transmissions satisfying a scheduling constraint that is based on an uplink control transmission type of the multiple uplink control transmissions that overlap with the uplink data transmission. In some cases, the scheduling constraint is satisfied when the uplink control transmission type associated with each of the multiple uplink control transmissions of the corresponding second transmission time intervals are different. In some cases, the scheduling constraint is not satisfied when at least two of the uplink control transmission type associated with each of the multiple uplink control transmissions of the corresponding second transmission time intervals are the same. In some cases, the scheduling constraint is not satisfied when at least two of the multiple uplink control transmissions are of an ACK/NACK transmission type. In some cases, the scheduling constraint is not satisfied when at least two of the multiple uplink control transmissions are of a channel performance feedback transmission type.

The uplink transmission manager 1115 may receive the uplink data transmission and the multiple uplink control transmissions based on the scheduling constraint being satisfied.

The uplink transmission type manager 1120 may identify an uplink control transmission type for each of the multiple uplink control transmissions. In some examples, the uplink transmission type manager 1120 may determine that the uplink control transmission types are different for the multiple uplink control transmissions. In some examples, the uplink transmission type manager 1120 may determine that the multiple uplink control transmissions satisfy the scheduling constraint based on the different uplink control transmission type. In some cases, the different uplink control transmission type includes an ACK/NACK transmission type and a non-ACK/NACK transmission type. In some cases, the different uplink control transmission type includes a channel performance feedback transmission type and a non-channel performance feedback transmission type.

The compliance manager 1125 may identify an uplink control transmission type for each of the multiple uplink control transmissions. In some examples, the compliance manager 1125 may determine that the uplink control transmission types are the same for the multiple uplink control transmissions. In some examples, the compliance manager 1125 may determine that the multiple uplink control transmissions satisfy the scheduling constraint based on the same uplink control transmission type. In some cases, the same uplink control transmission type includes a scheduling request transmission type.

Figure 12:
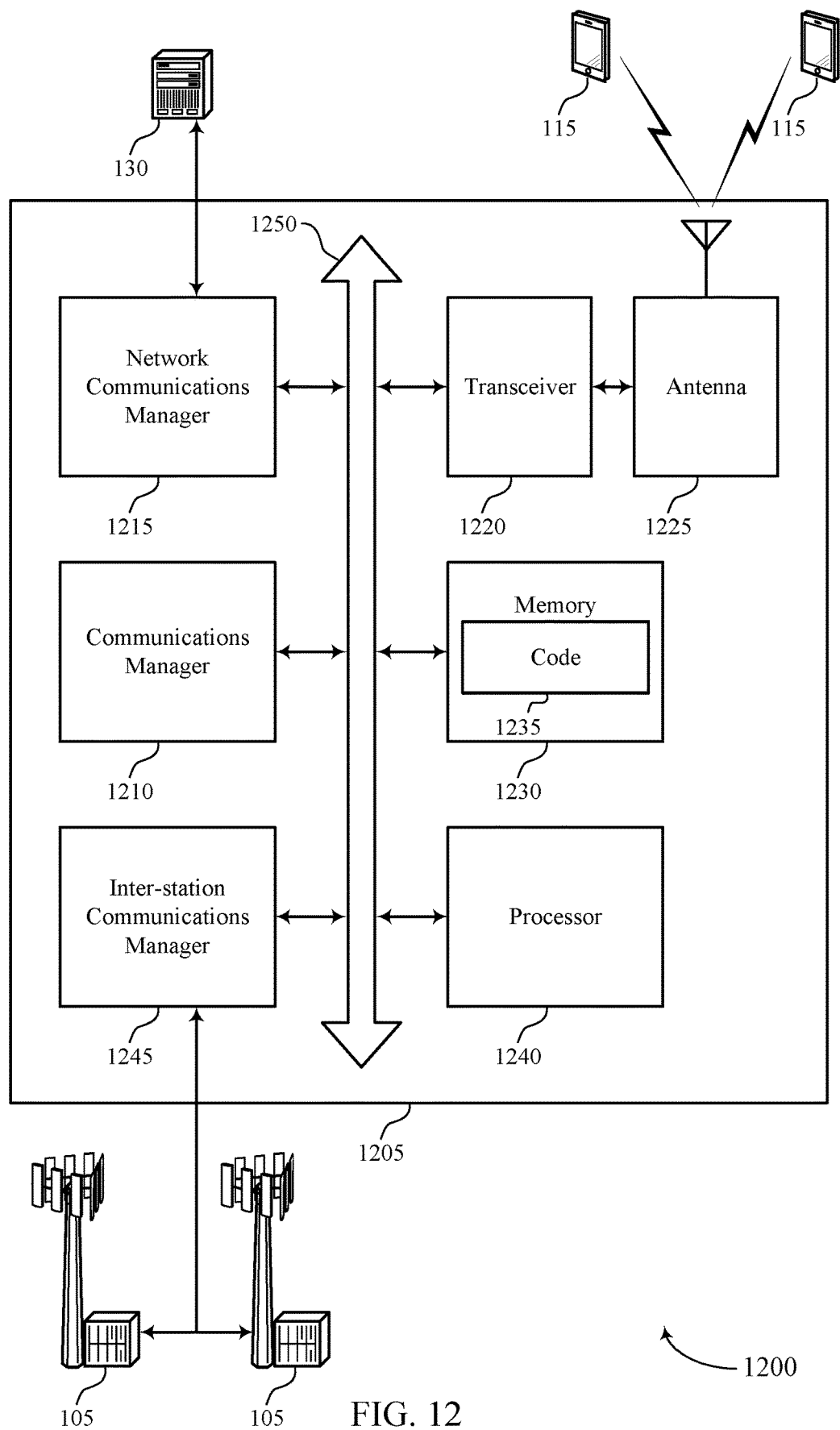
FIG. 12 shows a diagram of a system including a device that supports UCI piggyback restrictions for URLLC in accordance with aspects of the present disclosure.

FIG. 12 shows a diagram of a system 1200 including a device 1205 that supports UCI piggyback restrictions for URLLC in accordance with aspects of the present disclosure. The device 1205 may be an example of or include the components of device 905, device 1005, or a base station 105 as described herein. The device 1205 may include components for bi-directional voice and data communications including components for transmitting and receiving communications, including a communications manager 1210, a network communications manager 1215, a transceiver 1220, an antenna 1225, memory 1230, a processor 1240, and an inter-station communications manager 1245. These components may be in electronic communication via one or more buses (e.g., bus 1250).

The communications manager 1210 may schedule an uplink data transmission for transmission by a UE in a first transmission time interval that overlaps with multiple uplink control transmissions also scheduled for transmission by the UE during corresponding second transmission time intervals that are shorter in duration than the first transmission time interval, the multiple uplink control transmissions satisfying a scheduling constraint that is based on an uplink control transmission type of the multiple uplink control transmissions that overlap with the uplink data transmission and receive the uplink data transmission and the multiple uplink control transmissions based on the scheduling constraint being satisfied.

The network communications manager 1215 may manage communications with the core network (e.g., via one or more wired backhaul links). For example, the network communications manager 1215 may manage the transfer of data communications for client devices, such as one or more UEs 115.

The transceiver 1220 may communicate bi-directionally, via one or more antennas, wired, or wireless links as described above. For example, the transceiver 1220 may represent a wireless transceiver and may communicate bi-directionally with another wireless transceiver. The transceiver 1220 may also include a modem to modulate the packets and provide the modulated packets to the antennas for transmission, and to demodulate packets received from the antennas.

In some cases, the wireless device may include a single antenna 1225. However, in some cases the device may have more than one antenna 1225, which may be capable of concurrently transmitting or receiving multiple wireless transmissions.

The memory 1230 may include RAM, ROM, or a combination thereof. The memory 1230 may store computer-readable code 1235 including instructions that, when executed by a processor (e.g., the processor 1240) cause the device to perform various functions described herein. In some cases, the memory 1230 may contain, among other things, a BIOS which may control basic hardware or software operation such as the interaction with peripheral components or devices.

The processor 1240 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1240 may be configured to operate a memory array using a memory controller. In some cases, a memory controller may be integrated into processor 1240. The processor 1240 may be configured to execute computer-readable instructions stored in a memory (e.g., the memory 1230) to cause the device 1205 to perform various functions (e.g., functions or tasks supporting UCI piggyback restrictions for URLLC).

The inter-station communications manager 1245 may manage communications with other base station 105, and may include a controller or scheduler for controlling communications with UEs 115 in cooperation with other base stations 105. For example, the inter-station communications manager 1245 may coordinate scheduling for transmissions to UEs 115 for various interference mitigation techniques such as beamforming or joint transmission. In some examples, the inter-station communications manager 1245 may provide an X2 interface within an LTE/LTE-A wireless communication network technology to provide communication between base stations 105.

The code 1235 may include instructions to implement aspects of the present disclosure, including instructions to support wireless communications. The code 1235 may be stored in a non-transitory computer-readable medium such as system memory or other type of memory. In some cases, the code 1235 may not be directly executable by the processor 1240 but may cause a computer (e.g., when compiled and executed) to perform functions described herein.

Figure 13:
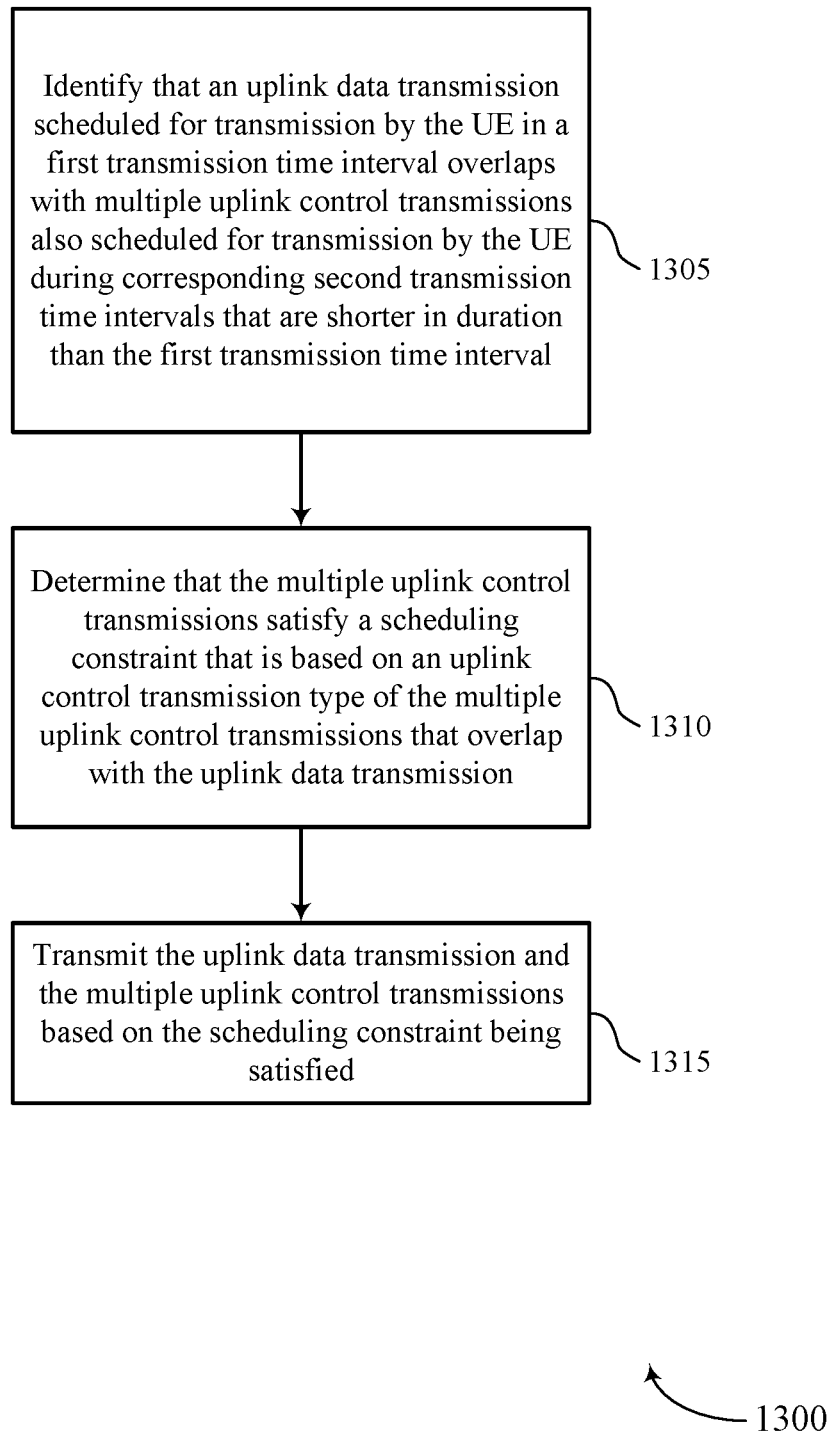
FIGS. 13 through 16 show flowcharts illustrating methods that support UCI piggyback restrictions for URLLC in accordance with aspects of the present disclosure.

FIG. 13 shows a flowchart illustrating a method 1300 that supports UCI piggyback restrictions for URLLC in accordance with aspects of the present disclosure. The operations of method 1300 may be implemented by a UE 115 or its components as described herein. For example, the operations of method 1300 may be performed by a communications manager as described with reference to FIGS. 5 through 8. In some examples, a UE may execute a set of instructions to control the functional elements of the UE to perform the functions described below. Additionally or alternatively, a UE may perform aspects of the functions described below using special-purpose hardware.

At 1305, the UE may identify that an uplink data transmission scheduled for transmission by the UE in a first transmission time interval overlaps with multiple uplink control transmissions also scheduled for transmission by the UE during corresponding second transmission time intervals that are shorter in duration than the first transmission time interval. The operations of 1305 may be performed according to the methods described herein. In some examples, aspects of the operations of 1305 may be performed by an overlap manager as described with reference to FIGS. 5 through 8.

At 1310, the UE may determine that the multiple uplink control transmissions satisfy a scheduling constraint that is based on an uplink control transmission type of the multiple uplink control transmissions that overlap with the uplink data transmission. The operations of 1310 may be performed according to the methods described herein. In some examples, aspects of the operations of 1310 may be performed by a scheduling constraint manager as described with reference to FIGS. 5 through 8.

At 1315, the UE may transmit the uplink data transmission and the multiple uplink control transmissions based on the scheduling constraint being satisfied. The operations of 1315 may be performed according to the methods described herein. In some examples, aspects of the operations of 1315 may be performed by an uplink transmission manager as described with reference to FIGS. 5 through 8.

Figure 14:
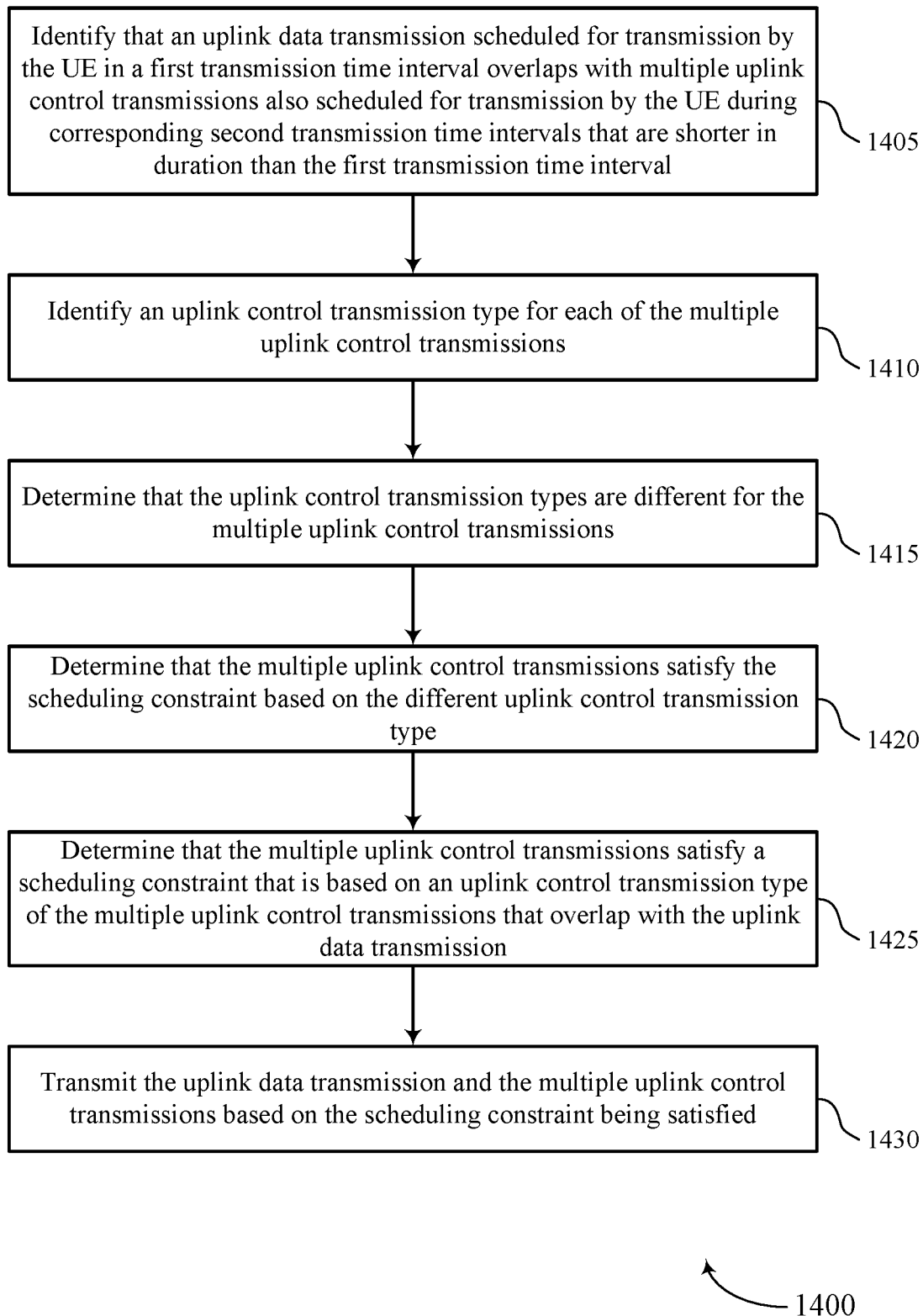

FIG. 14 shows a flowchart illustrating a method 1400 that supports UCI piggyback restrictions for URLLC in accordance with aspects of the present disclosure. The operations of method 1400 may be implemented by a UE 115 or its components as described herein. For example, the operations of method 1400 may be performed by a communications manager as described with reference to FIGS. 5 through 8. In some examples, a UE may execute a set of instructions to control the functional elements of the UE to perform the functions described below. Additionally or alternatively, a UE may perform aspects of the functions described below using special-purpose hardware.

At 1405, the UE may identify that an uplink data transmission scheduled for transmission by the UE in a first transmission time interval overlaps with multiple uplink control transmissions also scheduled for transmission by the UE during corresponding second transmission time intervals that are shorter in duration than the first transmission time interval. The operations of 1405 may be performed according to the methods described herein. In some examples, aspects of the operations of 1405 may be performed by an overlap manager as described with reference to FIGS. 5 through 8.

At 1410, the UE may identify an uplink control transmission type for each of the multiple uplink control transmissions. The operations of 1410 may be performed according to the methods described herein. In some examples, aspects of the operations of 1410 may be performed by an uplink transmission type manager as described with reference to FIGS. 5 through 8.

At 1415, the UE may determine that the uplink control transmission types are different for the multiple uplink control transmissions. The operations of 1415 may be performed according to the methods described herein. In some examples, aspects of the operations of 1415 may be performed by an uplink transmission type manager as described with reference to FIGS. 5 through 8.

At 1420, the UE may determine that the multiple uplink control transmissions satisfy the scheduling constraint based on the different uplink control transmission type. The operations of 1420 may be performed according to the methods described herein. In some examples, aspects of the operations of 1420 may be performed by an uplink transmission type manager as described with reference to FIGS. 5 through 8.

At 1425, the UE may determine that the multiple uplink control transmissions satisfy a scheduling constraint that is based on an uplink control transmission type of the multiple uplink control transmissions that overlap with the uplink data transmission. The operations of 1425 may be performed according to the methods described herein. In some examples, aspects of the operations of 1425 may be performed by a scheduling constraint manager as described with reference to FIGS. 5 through 8.

At 1430, the UE may transmit the uplink data transmission and the multiple uplink control transmissions based on the scheduling constraint being satisfied. The operations of 1430 may be performed according to the methods described herein. In some examples, aspects of the operations of 1430 may be performed by an uplink transmission manager as described with reference to FIGS. 5 through 8.

Figure 15:
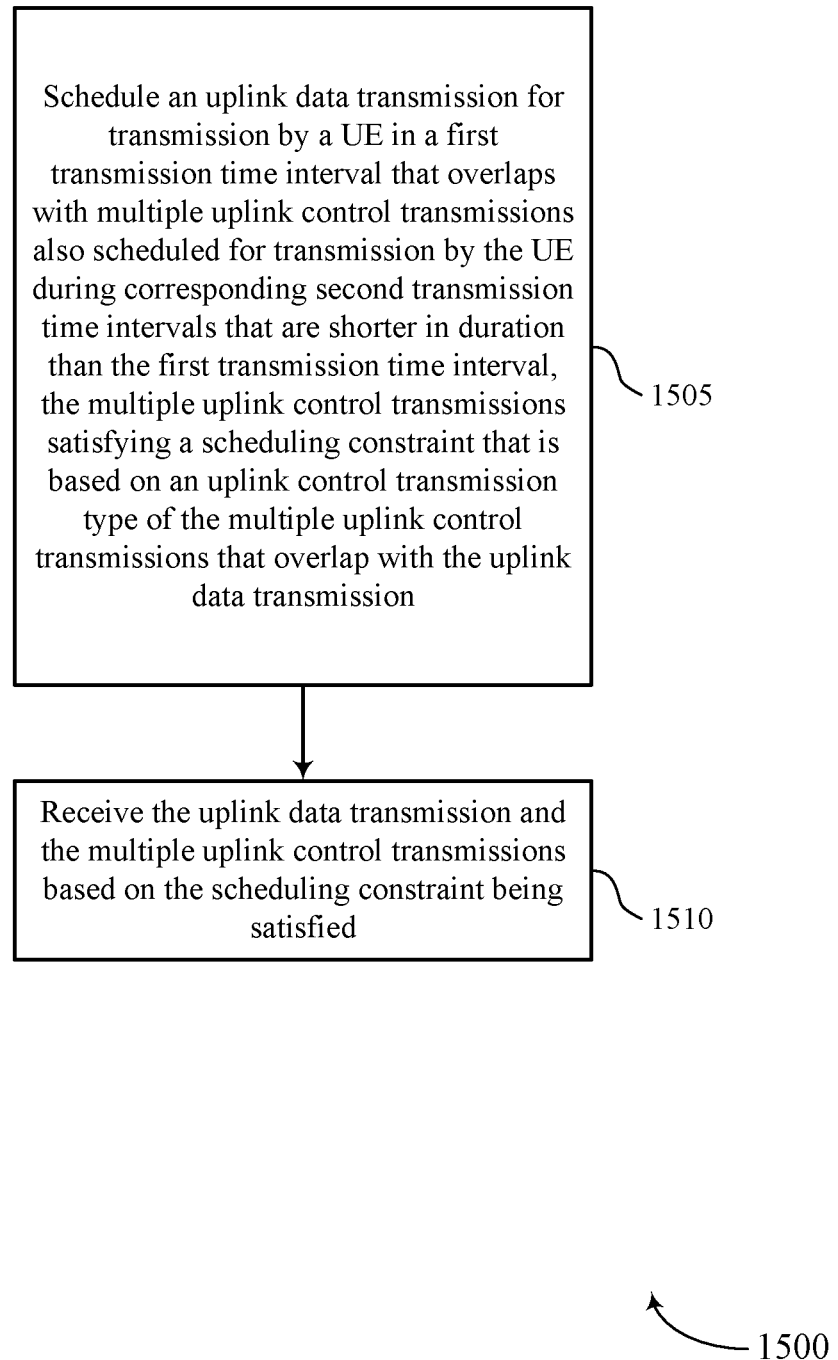

FIG. 15 shows a flowchart illustrating a method 1500 that supports UCI piggyback restrictions for URLLC in accordance with aspects of the present disclosure. The operations of method 1500 may be implemented by a base station 105 or its components as described herein. For example, the operations of method 1500 may be performed by a communications manager as described with reference to FIGS. 9 through 12. In some examples, a base station may execute a set of instructions to control the functional elements of the base station to perform the functions described below. Additionally or alternatively, a base station may perform aspects of the functions described below using special-purpose hardware.

At 1505, the base station may schedule an uplink data transmission for transmission by a UE in a first transmission time interval that overlaps with multiple uplink control transmissions also scheduled for transmission by the UE during corresponding second transmission time intervals that are shorter in duration than the first transmission time interval, the multiple uplink control transmissions satisfying a scheduling constraint that is based on an uplink control transmission type of the multiple uplink control transmissions that overlap with the uplink data transmission. The operations of 1505 may be performed according to the methods described herein. In some examples, aspects of the operations of 1505 may be performed by a scheduling constraint manager as described with reference to FIGS. 9 through 12.

At 1510, the base station may receive the uplink data transmission and the multiple uplink control transmissions based on the scheduling constraint being satisfied. The operations of 1510 may be performed according to the methods described herein. In some examples, aspects of the operations of 1510 may be performed by an uplink transmission manager as described with reference to FIGS. 9 through 12.

Figure 16:
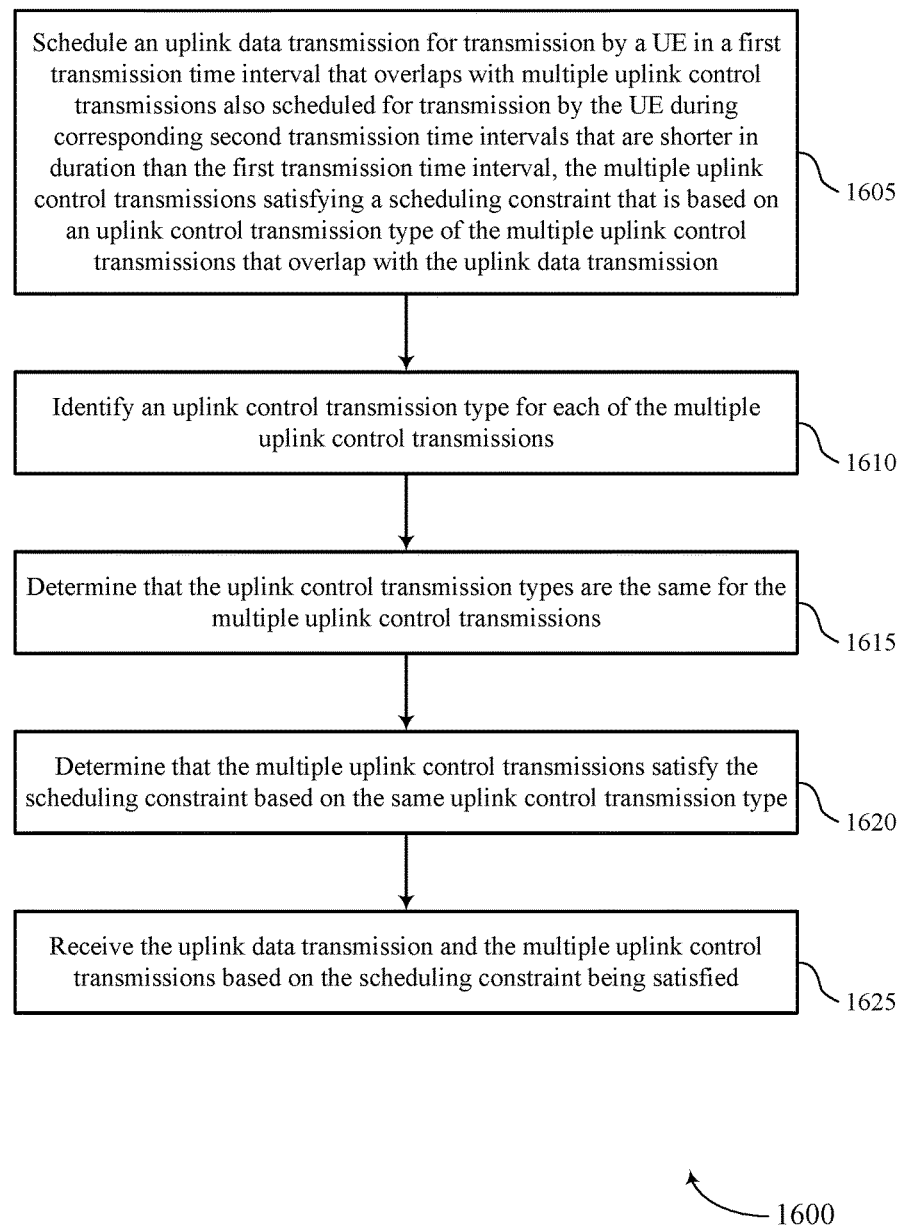

FIG. 16 shows a flowchart illustrating a method 1600 that supports UCI piggyback restrictions for URLLC in accordance with aspects of the present disclosure. The operations of method 1600 may be implemented by a base station 105 or its components as described herein. For example, the operations of method 1600 may be performed by a communications manager as described with reference to FIGS. 9 through 12. In some examples, a base station may execute a set of instructions to control the functional elements of the base station to perform the functions described below. Additionally or alternatively, a base station may perform aspects of the functions described below using special-purpose hardware.

At 1605, the base station may schedule an uplink data transmission for transmission by a UE in a first transmission time interval that overlaps with multiple uplink control transmissions also scheduled for transmission by the UE during corresponding second transmission time intervals that are shorter in duration than the first transmission time interval, the multiple uplink control transmissions satisfying a scheduling constraint that is based on an uplink control transmission type of the multiple uplink control transmissions that overlap with the uplink data transmission. The operations of 1605 may be performed according to the methods described herein. In some examples, aspects of the operations of 1605 may be performed by a scheduling constraint manager as described with reference to FIGS. 9 through 12.

At 1610, the base station may identify an uplink control transmission type for each of the multiple uplink control transmissions. The operations of 1610 may be performed according to the methods described herein. In some examples, aspects of the operations of 1610 may be performed by a compliance manager as described with reference to FIGS. 9 through 12.

At 1615, the base station may determine that the uplink control transmission types are the same for the multiple uplink control transmissions. The operations of 1615 may be performed according to the methods described herein. In some examples, aspects of the operations of 1615 may be performed by a compliance manager as described with reference to FIGS. 9 through 12.

At 1620, the base station may determine that the multiple uplink control transmissions satisfy the scheduling constraint based on the same uplink control transmission type. The operations of 1620 may be performed according to the methods described herein. In some examples, aspects of the operations of 1620 may be performed by a compliance manager as described with reference to FIGS. 9 through 12.

At 1625, the base station may receive the uplink data transmission and the multiple uplink control transmissions based on the scheduling constraint being satisfied. The operations of 1625 may be performed according to the methods described herein. In some examples, aspects of the operations of 1625 may be performed by an uplink transmission manager as described with reference to FIGS. 9 through 12.

Aspect 1: A method for wireless communication at a user equipment (UE), comprising: identifying that an uplink data transmission scheduled for transmission by the UE in a first transmission time interval overlaps with multiple uplink control transmissions scheduled for transmission by the UE during corresponding second transmission time intervals that are shorter in duration than the first transmission time interval; determining whether the multiple uplink control transmissions satisfy a scheduling constraint that is based at least in part on uplink control transmission types of the multiple uplink control transmissions that overlap with the uplink data transmission; and transmitting the uplink data transmission and the multiple uplink control transmissions based at least in part on the scheduling constraint being satisfied.

Aspect 2: The method of aspect 1, wherein the scheduling constraint is not satisfied when the uplink control transmission types of at least two of the multiple uplink control transmissions of the corresponding second transmission time intervals are the same.

Aspect 3: The method of any of aspects 1 or 2, wherein the scheduling constraint is not satisfied when at least two of the multiple uplink control transmissions are of an acknowledgement/negative-acknowledgement (ACK/NACK) transmission type.

Aspect 4: The method of any of aspects 1 to 3, wherein the scheduling constraint is not satisfied when at least two of the multiple uplink control transmissions are of a channel performance feedback transmission type.

Aspect 5: The method of any of aspects 1 to 4, further comprising: determining that the uplink control transmission types are different for the multiple uplink control transmissions; and determining that the multiple uplink control transmissions satisfy the scheduling constraint based at least in part on the determining that the uplink control transmission types are different.

Aspect 6: The method of any of aspects 1 to 5, wherein the different uplink control transmission types comprise an acknowledgement/negative-acknowledgement (ACK/NACK) transmission type and a non-ACK/NACK transmission type.

Aspect 7: The method of any of aspects 1 to 6, wherein the different uplink control transmission types comprise a channel performance feedback transmission type and a non-channel performance feedback transmission type.

Aspect 8: The method of any of aspects 1 to 7, wherein the scheduling constraint is satisfied when the uplink control transmission types of the multiple uplink control transmissions of the corresponding second transmission time intervals are different from one another.

Aspect 9: The method of any of aspects 1 to 8, further comprising: determining that the uplink control transmission types are the same for the multiple uplink control transmissions; and determining that the multiple uplink control transmissions satisfy the scheduling constraint based at least in part on the determining that the uplink control transmission types are the same.

Aspect 10: The method of aspect 9, wherein the same uplink control transmission types comprise a scheduling request transmission type.

Aspect 11: The method of any of aspects 1 to 10, wherein the first transmission time interval comprises a slot and the corresponding second transmission time intervals comprise sub-slots.

Aspect 12: An apparatus for wireless communication at a user equipment (UE), comprising a processor, memory coupled with the processor; and instructions stored in the memory and executable by the processor to cause the apparatus to perform a method of any of aspects 1 to 11.

Aspect 13: An apparatus comprising at least one means for performing a method of any of aspects 1 to 11.

Aspect 14: A non-transitory computer-readable medium storing code for wireless communications, the code comprising instructions executable by a processor to perform a method of any of aspects 1 to 11.

Aspect 15: A method for wireless communication at a base station, comprising: determining whether to schedule an uplink data transmission for transmission by a user equipment (UE) in a first transmission time interval that overlaps with multiple uplink control transmissions scheduled for transmission by the UE during corresponding second transmission time intervals that are shorter in duration than the first transmission time interval, the determining based at least in part on whether the multiple uplink control transmissions satisfy a scheduling constraint that is based at least in part on uplink control transmission types of the multiple uplink control transmissions that overlap with the first transmission time interval; scheduling the uplink data transmission based at least in part on the determining; and receiving the uplink data transmission and the multiple uplink control transmissions based at least in part on the scheduling constraint being satisfied.

Aspect 16: The method of aspect 15, wherein the scheduling constraint is not satisfied when the uplink control transmission types of at least two of the multiple uplink control transmissions of the corresponding second transmission time intervals are the same.

Aspect 17: The method of aspects 15 or 16, wherein the scheduling constraint is not satisfied when at least two of the multiple uplink control transmissions are of an acknowledgement/negative-acknowledgement (ACK/NACK) transmission type.

Aspect 18: The method of any of aspects 15 to 17, wherein the scheduling constraint is not satisfied when at least two of the multiple uplink control transmissions are of a channel performance feedback transmission type.

Aspect 19: The method of any of aspects 15 to 18, further comprising: determining that the uplink control transmission types are different for the multiple uplink control transmissions; and determining that the multiple uplink control transmissions satisfy the scheduling constraint based at least in part on the determining that the uplink control transmission types are different.

Aspect 20: The method of any of aspects 15 to 19, wherein the different uplink control transmission types comprise an acknowledgement/negative-acknowledgement (ACK/NACK) transmission type and a non-ACK/NACK transmission type.

Aspect 21: The method of any of aspects 15 to 20, wherein the different uplink control transmission types comprise a channel performance feedback transmission type and a non-channel performance feedback transmission type.

Aspect 22: The method of any of aspects 15 to 21, wherein the scheduling constraint is satisfied when the uplink control transmission types of the multiple uplink control transmissions of the corresponding second transmission time intervals are different from one another.

Aspect 23: The method of any of aspects 15 to 22, further comprising: determining that the uplink control transmission types are the same for the multiple uplink control transmissions; and determining that the multiple uplink control transmissions satisfy the scheduling constraint based at least in part on the determining that the uplink control transmission types are the same.

Aspect 24: The method of aspect 23, wherein the same uplink control transmission types comprise a scheduling request transmission type.

Aspect 25: The method of any of aspects 15 to 23, wherein the first transmission time interval comprises a slot and the corresponding second transmission time intervals comprise sub-slots.

Aspect 26: An apparatus for wireless communication at a base station, comprising a processor, memory coupled with the processor; and instructions stored in the memory and executable by the processor to cause the apparatus to perform a method of any of aspects 15 to 25.

Aspect 13: An apparatus comprising at least one means for performing a method of any of aspects 15 to 25.

Aspect 14: A non-transitory computer-readable medium storing code for wireless communications, the code comprising instructions executable by a processor to perform a method of any of aspects 15 to 25.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special purpose computer. By way of example, and not limitation, non-transitory computer-readable media may include random-access memory (RAM), read-only memory (ROM), electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication at a user equipment (UE), comprising:
    identifying that an uplink data transmission scheduled for transmission by the UE in a first transmission time interval overlaps with multiple uplink control transmissions scheduled for transmission by the UE during corresponding second transmission time intervals that are shorter in duration than the first transmission time interval;
    determining whether the multiple uplink control transmissions satisfy a scheduling constraint that is based at least in part on uplink control transmission types of the multiple uplink control transmissions that overlap with the uplink data transmission; and
    transmitting the uplink data transmission and the multiple uplink control transmissions based at least in part on the scheduling constraint being satisfied.

2. The method of claim 1, wherein the scheduling constraint is not satisfied when the uplink control transmission types of at least two of the multiple uplink control transmissions of the corresponding second transmission time intervals are the same.

3. The method of claim 1, wherein the scheduling constraint is not satisfied when at least two of the multiple uplink control transmissions are of an acknowledgement/negative-acknowledgement (ACK/NACK) transmission type.

4. The method of claim 1, wherein the scheduling constraint is not satisfied when at least two of the multiple uplink control transmissions are of a channel performance feedback transmission type.

5. The method of claim 1, further comprising:
    determining that the uplink control transmission types are different for the multiple uplink control transmissions; and
    determining that the multiple uplink control transmissions satisfy the scheduling constraint based at least in part on the determining that the uplink control transmission types are different.

6. The method of claim 5, wherein the different uplink control transmission types comprise an acknowledgement/negative-acknowledgement (ACK/NACK) transmission type and a non-ACK/NACK transmission type.

7. The method of claim 5, wherein the different uplink control transmission types comprise a channel performance feedback transmission type and a non-channel performance feedback transmission type.

8. The method of claim 1, wherein the scheduling constraint is satisfied when the uplink control transmission types of the multiple uplink control transmissions of the corresponding second transmission time intervals are different from one another.

9. The method of claim 1, further comprising:
    determining that the uplink control transmission types are the same for the multiple uplink control transmissions; and
    determining that the multiple uplink control transmissions satisfy the scheduling constraint based at least in part on the determining that the uplink control transmission types are the same.

10. The method of claim 9, wherein the same uplink control transmission types comprise a scheduling request transmission type.

11. The method of claim 1, wherein the first transmission time interval comprises a slot and the corresponding second transmission time intervals comprise sub-slots.

12. A method for wireless communication at a base station, comprising:
    determining whether to schedule an uplink data transmission for transmission by a user equipment (UE) in a first transmission time interval that overlaps with multiple uplink control transmissions scheduled for transmission by the UE during corresponding second transmission time intervals that are shorter in duration than the first transmission time interval, the determining based at least in part on whether the multiple uplink control transmissions satisfy a scheduling constraint that is based at least in part on uplink control transmission types of the multiple uplink control transmissions that overlap with the first transmission time interval;
    scheduling the uplink data transmission based at least in part on the determining; and
    receiving the uplink data transmission and the multiple uplink control transmissions based at least in part on the scheduling constraint being satisfied.

13. The method of claim 12, wherein the scheduling constraint is not satisfied when the uplink control transmission types of at least two of the multiple uplink control transmissions of the corresponding second transmission time intervals are the same.

14. The method of claim 12, wherein the scheduling constraint is not satisfied when at least two of the multiple uplink control transmissions are of an acknowledgement/negative-acknowledgement (ACK/NACK) transmission type.

15. The method of claim 12, wherein the scheduling constraint is not satisfied when at least two of the multiple uplink control transmissions are of a channel performance feedback transmission type.

16. The method of claim 12, further comprising:
    determining that the uplink control transmission types are different for the multiple uplink control transmissions; and
    determining that the multiple uplink control transmissions satisfy the scheduling constraint based at least in part on the determining that the uplink control transmission types are different.

17. The method of claim 16, wherein the different uplink control transmission types comprise an acknowledgement/negative-acknowledgement (ACK/NACK) transmission type and a non-ACK/NACK transmission type.

18. The method of claim 16, wherein the different uplink control transmission types comprise a channel performance feedback transmission type and a non-channel performance feedback transmission type.

19. The method of claim 12, wherein the scheduling constraint is satisfied when the uplink control transmission types of the multiple uplink control transmissions of the corresponding second transmission time intervals are different from one another.

20. The method of claim 12, further comprising:
    determining that the uplink control transmission types are the same for the multiple uplink control transmissions; and
    determining that the multiple uplink control transmissions satisfy the scheduling constraint based at least in part on the determining that the uplink control transmission types are the same.

21. The method of claim 20, wherein the same uplink control transmission types comprise a scheduling request transmission type.

22. The method of claim 12, wherein the first transmission time interval comprises a slot and the corresponding second transmission time intervals comprise sub-slots.

23. An apparatus for wireless communication at a user equipment (UE), comprising:
    a processor,
    memory coupled with the processor; and
    instructions stored in the memory and executable by the processor to cause the apparatus to:
        identify that an uplink data transmission scheduled for transmission by the UE in a first transmission time interval overlaps with multiple uplink control transmissions scheduled for transmission by the UE during corresponding second transmission time intervals that are shorter in duration than the first transmission time interval;
        determine whether the multiple uplink control transmissions satisfy a scheduling constraint that is based at least in part on uplink control transmission types of the multiple uplink control transmissions that overlap with the uplink data transmission; and
        transmit the uplink data transmission and the multiple uplink control transmissions based at least in part on the scheduling constraint being satisfied.

24. The apparatus of claim 23, wherein the scheduling constraint is not satisfied when the uplink control transmission types of at least two of the multiple uplink control transmissions of the corresponding second transmission time intervals are the same.

25. The apparatus of claim 23, wherein the scheduling constraint is not satisfied when at least two of the multiple uplink control transmissions are of an acknowledgement/negative-acknowledgement (ACK/NACK) transmission type.

26. The apparatus of claim 23, wherein the scheduling constraint is not satisfied when at least two of the multiple uplink control transmissions are of a channel performance feedback transmission type.

27. The apparatus of claim 23, wherein the instructions are further executable by the processor to cause the apparatus to:
    determine that the uplink control transmission types are different for the multiple uplink control transmissions; and
    determine that the multiple uplink control transmissions satisfy the scheduling constraint based at least in part on the determining that the uplink control transmission types are different.

28. The apparatus of claim 27, wherein the different uplink control transmission types comprise an acknowledgement/negative-acknowledgement (ACK/NACK) transmission type and a non-ACK/NACK transmission type.

29. The apparatus of claim 27, wherein the different uplink control transmission types comprise a channel performance feedback transmission type and a non-channel performance feedback transmission type.

30. The apparatus of claim 23, wherein the scheduling constraint is satisfied when the uplink control transmission types of the multiple uplink control transmissions of the corresponding second transmission time intervals are different from one another.

31. The apparatus of claim 23, wherein the instructions are further executable by the processor to cause the apparatus to:
    determine that the uplink control transmission types are the same for the multiple uplink control transmissions; and
    determine that the multiple uplink control transmissions satisfy the scheduling constraint based at least in part on the determining that the uplink control transmission types are the same.

32. The apparatus of claim 31, wherein the same uplink control transmission types comprise a scheduling request transmission type.

33. The apparatus of claim 23, wherein the first transmission time interval comprises a slot and the corresponding second transmission time intervals comprise sub-slots.

34. An apparatus for wireless communication at a base station, comprising:
    a processor,
    memory coupled with the processor; and
    instructions stored in the memory and executable by the processor to cause the apparatus to:
        determine whether to schedule an uplink data transmission for transmission by a user equipment (UE) in a first transmission time interval that overlaps with multiple uplink control transmissions scheduled for transmission by the UE during corresponding second transmission time intervals that are shorter in duration than the first transmission time interval, the determining based at least in part on whether the multiple uplink control transmissions satisfy a scheduling constraint that is based at least in part on uplink control transmission types of the multiple uplink control transmissions that overlap with the first transmission time interval;
schedule the uplink data transmission based at least in part on the determining; and
receive the uplink data transmission and the multiple uplink control transmissions based at least in part on the scheduling constraint being satisfied.

35. The apparatus of claim 34, wherein the scheduling constraint is not satisfied when the uplink control transmission types of the multiple uplink control transmissions of the corresponding second transmission time intervals are the same.

36. The apparatus of claim 34, wherein the scheduling constraint is not satisfied when at least two of the multiple uplink control transmissions are of an acknowledgement/negative-acknowledgement (ACK/NACK) transmission type.

37. The apparatus of claim 34, wherein the scheduling constraint is not satisfied when at least two of the multiple uplink control transmissions are of a channel performance feedback transmission type.

38. The apparatus of claim 34, wherein the instructions are further executable by the processor to cause the apparatus to:
determine that the uplink control transmission types are different for the multiple uplink control transmissions; and
determine that the multiple uplink control transmissions satisfy the scheduling constraint based at least in part on the determining that the uplink control transmission types are different.

39. The apparatus of claim 38, wherein the different uplink control transmission types comprise an acknowledgement/negative-acknowledgement (ACK/NACK) transmission type and a non-ACK/NACK transmission type.

40. The apparatus of claim 38, wherein the different uplink control transmission types comprise a channel performance feedback transmission type and a non-channel performance feedback transmission type.

41. The apparatus of claim 34, wherein the scheduling constraint is satisfied when the uplink control transmission types of the multiple uplink control transmissions of the corresponding second transmission time intervals are different from one another.

42. The apparatus of claim 34, wherein the instructions are further executable by the processor to cause the apparatus to:
determine that the uplink control transmission types are the same for the multiple uplink control transmissions; and
determine that the multiple uplink control transmissions satisfy the scheduling constraint based at least in part on the determining that the uplink control transmission types are the same.

43. The apparatus of claim 42, wherein the same uplink control transmission types comprise a scheduling request transmission type.

44. The apparatus of claim 34, wherein the first transmission time interval comprises a slot and the corresponding second transmission time intervals comprise sub-slots.

45. An apparatus for wireless communication at a user equipment (UE), comprising:
means for identifying that an uplink data transmission scheduled for transmission by the UE in a first transmission time interval overlaps with multiple uplink control transmissions scheduled for transmission by the UE during corresponding second transmission time intervals that are shorter in duration than the first transmission time interval;
means for determining whether the multiple uplink control transmissions satisfy a scheduling constraint that is based at least in part on uplink control transmission types of the multiple uplink control transmissions that overlap with the uplink data transmission; and
means for transmitting the uplink data transmission and the multiple uplink control transmissions based at least in part on the scheduling constraint being satisfied.

46. The apparatus of claim 45, wherein the scheduling constraint is not satisfied when the uplink control transmission types of at least two of the multiple uplink control transmissions of the corresponding second transmission time intervals are the same.

47. The apparatus of claim 45, wherein the scheduling constraint is not satisfied when at least two of the multiple uplink control transmissions are of an acknowledgement/negative-acknowledgement (ACK/NACK) transmission type.

48. An apparatus for wireless communication at a base station, comprising:
means for determining whether to schedule an uplink data transmission for transmission by a user equipment (UE) in a first transmission time interval that overlaps with multiple uplink control transmissions scheduled for transmission by the UE during corresponding second transmission time intervals that are shorter in duration than the first transmission time interval, the determining based at least in part on whether the multiple uplink control transmissions satisfy a scheduling constraint that is based at least in part on uplink control transmission types of the multiple uplink control transmissions that overlap with the first transmission time interval;
means for scheduling the uplink data transmission based at least in part on the determining; and
means for receiving the uplink data transmission and the multiple uplink control transmissions based at least in part on the scheduling constraint being satisfied.

49. The apparatus of claim 48, wherein the scheduling constraint is not satisfied when the uplink control transmission types of at least two of the multiple uplink control transmissions of the corresponding second transmission time intervals are the same.

50. The apparatus of claim 48, wherein the scheduling constraint is not satisfied when at least two of the multiple uplink control transmissions are of an acknowledgement/negative-acknowledgement (ACK/NACK) transmission type.

51. A non-transitory computer-readable medium storing code for wireless communication at a user equipment (UE), the code comprising instructions executable by a processor to:
identify that an uplink data transmission scheduled for transmission by the UE in a first transmission time interval overlaps with multiple uplink control transmissions scheduled for transmission by the UE during corresponding second transmission time intervals that are shorter in duration than the first transmission time interval;

determine whether the multiple uplink control transmissions satisfy a scheduling constraint that is based at least in part on uplink control transmission types of the multiple uplink control transmissions that overlap with the uplink data transmission; and transmit the uplink data transmission and the multiple uplink control transmissions based at least in part on whether the scheduling constraint being satisfied.

52. The non-transitory computer-readable medium of claim 51, wherein the scheduling constraint is not satisfied when the uplink control transmission types of at least two of the multiple uplink control transmissions of the corresponding second transmission time intervals are the same.

53. The non-transitory computer-readable medium of claim 51, wherein the scheduling constraint is not satisfied when at least two of the multiple uplink control transmissions are of an acknowledgement/negative-acknowledgement (ACK/NACK) transmission type.

54. A non-transitory computer-readable medium storing code for wireless communication at a base station, the code comprising instructions executable by a processor to:

determine whether to schedule an uplink data transmission for transmission by a user equipment (UE) in a first transmission time interval that overlaps with multiple uplink control transmissions scheduled for transmission by the UE during corresponding second transmission time intervals that are shorter in duration than the first transmission time interval, the determining based at least in part on whether the multiple uplink control transmissions satisfy a scheduling constraint that is based at least in part on uplink control transmission types of the multiple uplink control transmissions that overlap with the first transmission time interval;

schedule the uplink data transmission based at least in part on the determining; and receive the uplink data transmission and the multiple uplink control transmissions based at least in part on the scheduling constraint being satisfied.

55. The non-transitory computer-readable medium of claim 54, wherein the scheduling constraint is not satisfied when the uplink control transmission types of at least two of the multiple uplink control transmissions of the corresponding second transmission time intervals are the same.

56. The non-transitory computer-readable medium of claim 54, wherein the scheduling constraint is not satisfied when at least two of the multiple uplink control transmissions are of an acknowledgement/negative-acknowledgement (ACK/NACK) transmission type.

* * * * *